(12) United States Patent  
Dunham

(10) Patent No.: US 6,269,431 B1
(45) Date of Patent: Jul. 31, 2001

(54) VIRTUAL STORAGE AND BLOCK LEVEL DIRECT ACCESS OF SECONDARY STORAGE FOR RECOVERY OF BACKUP DATA

(75) Inventor: Scott R. Dunham, Billerica, MA (US)

(73) Assignee: EMC Corporation, Hopkkinton, MA (US)

(*) Notice: Subject to any disclaimer, the term of this patent is extended or adjusted under 35 U.S.C. 154(b) by 0 days.

(21) Appl. No.: 09/133,564

(22) Filed: Aug. 13, 1998

(51) Int. Cl.⁷ .................................................. G06F 12/08
(52) U.S. Cl. .............................. 711/162; 711/6; 711/165; 707/204
(58) Field of Search ............................... 711/2, 4, 6, 161, 711/162, 165; 707/2, 204, 205

(56) References Cited

U.S. PATENT DOCUMENTS

| 4,686,620 | 8/1987 | Ng . |
| 4,755,928 | 7/1988 | Johnson et al. . |
| 5,060,185 | 10/1991 | Naito et al. . |
| 5,175,852 | 12/1992 | Johnson et al. . |
| 5,206,939 | 4/1993 | Yanai et al. . |
| 5,208,665 | 5/1993 | McCalley et al. ...................... 358/86 |
| 5,218,695 | 6/1993 | Noveck et al. . |
| 5,276,860 | 1/1994 | Fortier et al. . |
| 5,276,867 | 1/1994 | Kenley et al. . |
| 5,301,286 * | 4/1994 | Rajani ................................. 711/202 |
| 5,335,352 | 8/1994 | Yanai et al. . |
| 5,367,698 | 11/1994 | Webber et al. . |
| 5,371,532 | 12/1994 | Gelman et al. ......................... 348/7 |
| 5,381,539 | 1/1995 | Yanai et al. . |
| 5,442,749 | 8/1995 | Northcutt et al. . |
| 5,442,771 | 8/1995 | Filepp et al. . |
| 5,487,160 | 1/1996 | Bemis ................................. 711/114 |
| 5,519,435 | 5/1996 | Anderson ................................. 348/8 |
| 5,528,513 | 6/1996 | Vaitzblit et al. . |
| 5,535,381 | 7/1996 | Kopper ................................. 710/52 |
| 5,544,347 | 8/1996 | Yanai et al. ........................... 395/489 |
| 5,550,982 | 8/1996 | Long et al. . |
| 5,551,025 | 8/1996 | O'Reilly et al. . |
| 5,574,662 | 11/1996 | Windrem etal. . |

(List continued on next page.)

FOREIGN PATENT DOCUMENTS

| 0 633 694 | 1/1995 | (EP) . |
| WO93/16557 | 8/1993 | (WO) . |
| WO95/10918 | 4/1995 | (WO) . |

OTHER PUBLICATIONS

*Microsoft Press Computer Dictionary*, Third Edition, Microsoft Corporation, Redmond, Washington, 1997, pp. 497–500.

(List continued on next page.)

Primary Examiner—Richard L. Ellis
(74) Attorney, Agent, or Firm—Howrey Simon Arnold & White, LLP

(57) ABSTRACT

A data storage system has a primary data storage subsystem including primary data storage and a secondary data storage subsystem including secondary data storage. The secondary data storage contains backup versions of data stored in the primary data storage. To permit a host processor to access a specified backup version, the primary data storage subsystem assigns a virtual storage address to a specified backup version, and the host processor sends to the primary data storage subsystem data access requests that specify the virtual storage address. If the primary data storage subsystem has spare data storage, then a copy of the specified backup version is read from the secondary storage and written into the spare storage, and the address of the copy in the spare storage is mapped to the virtual storage address and accessed in response to the storage access requests from the host processor. Otherwise, a block-level direct access of the secondary storage is performed to access the specified backup version. In either case, the backup version appears to be in the primary data storage subsystem when the host accesses it.

23 Claims, 16 Drawing Sheets

U.S. PATENT DOCUMENTS

| | | |
|---|---|---|
| 5,586,264 | 12/1996 | Belknap et la. . |
| 5,590,320 | 12/1996 | Maxey . |
| 5,594,910 | 1/1997 | Filepp et al. . |
| 5,603,058 | 2/1997 | Belknap et al. . |
| 5,606,359 | 2/1997 | Youden et al. ........................... 348/7 |
| 5,625,405 | 4/1997 | DuLac et al. ............................ 348/7 |
| 5,633,810 | 5/1997 | Mandal et al. . |
| 5,633,999 | 5/1997 | Clowes et al. . |
| 5,634,111 | 5/1997 | Oeda et al. ........................... 395/480 |
| 5,673,382 | 9/1997 | Cannon et al. ................. 395/182.04 |
| 5,742,792 | 4/1998 | Yanai et al. ........................... 711/162 |
| 5,829,046 | 10/1998 | Tzelnic et al. ........................ 711/162 |
| 5,835,953 | 11/1998 | Ohran .................................... 711/162 |
| 5,835,954 | 11/1998 | Duyanovich et al. ................ 711/162 |
| 5,857,208 | 1/1999 | Ofek ..................................... 707/204 |
| 5,875,478 | 2/1999 | Blumeneau ........................... 711/162 |
| 5,991,793 | 11/1999 | Mukaida et al. ..................... 709/104 |
| 6,023,281 | 2/2000 | Grigor et al. ........................ 345/512 |
| 6,076,148 | 6/2000 | Kedem ................................. 711/162 |
| 6,081,875 | 6/2000 | Clifton et al. ........................ 711/162 |

OTHER PUBLICATIONS

Uresh Vahalia, *UNIX Internals: The new frontiers*, Chapter 9, "File System Implementations," Prentice–Hall, Inc., Upper Saddle River, New Jersey, 1996, pp. 261–289.

Mendel Rosenblum and John K. Ousterhout, "The Design and Implementation of a Log–Structured File System," *ACM Transactions on Computer Systems*, vol. 10, No. 1, Feb. 1992, pp. 26–52.

Sun Microsystems, Inc. "NFS: Network File System Protocol Specifications," Network Working Group, http://www.attrition.org/~modify/texts/rfc/rfc1094.txt, Mar. 1989, 23 pages.

David A. Patterson, Peter Chen, Garth Gibson, and Randy H. Katz, "Introduction to Redundant Arrays of Inexpensive Disks (RAID)," Digest of Papers in Spring COMPCON89, Feb. 27–Mar. 31, 1989, *Thirty–Fourth IEEE Computer Society International Conference*, San Francisco, CA, pp. 112–117.

Fred Douglis and John Ousterhout, "Log–Structured File Systems," Digest of Papers in Spring COMPCON89, Feb. 27–Mar. 31, 1989, *Thirty–Fourth IEEE Computer Society International Conference*, San Francisco, CA, pp. 124–129.

D.L. Burkes and R.K. Treiber, "Design Approaches for Real–Time Transaction Processing Remote Site Recovery," Digest of Papers in Spring COMPCON90, Feb. 26–Mar. 2, 1990, *Thirty–Fifth IEEE Computer Society International Conference*, San Francisco, CA, pp. 568–572.

Rangen PV, Vin HM, "Designing File Systems For Digital Audio and Video," Proceedings of the 13$^{th}$ ACM Symposium on Operating systems Principles, Monterey, Calif., 1991, pp. 81–94.

Vin HM, Rangan PV, (1993), "Designing a Multiuser HDTV Storage Service," IEEE Journal on Selected Areas in Communication, vol. 11, No. 1, Jan. 1993, pp. 153–164.

Anderson DP, Osawa Y, Govindan r, "A File System for Continuous Media," ACM Transactions on Compjter Systems, vol. 10., No. 4, Nov. 1992, pp. 311–337.

Federighi C, "A Distributed Hierarchical Storage Manager for a Video–on–Demand System," Department of Electrical Engr. and Computer Science, University of California, Berkeley, California, Dec. 1993.

Haskin, R, "The Shark Continuous–Media File Server." Proceedings, IEEE COMPCON 93, San Francisco, California, 1993, pp. 12–15.

Little TD, Rhanger G, Folz RJ, Gibbon JF, Reeve FW, Schelleng DH, Venkatesh D, "A Digital On–Demand Video Service Supporting Content Based queries," Proceedings of ACM Multimedia 93, Anaheim, California, Aug. 1–6, 1993, pp. 427–436.

Lougher, P, Sheperd, D. "The Design of a Storage Server For Continuous Media," The Computer Journal, vol. 36, No. 1, 1993, pp. 32–42.

Rangan PV, Vin HM, Ramanathan S, "Designing an On–Demand Multimedia Services," IEEE Communications Magazine, vol. 30, No. 7, Jul. 1992, pp. 56–64.

Sincoskie, WD, "System Architecture For a Large Scale Video on Demand Service," Computer Networks and ISDN Systems, vol. 22, No. 2, Sep. 1991, pp. 155–162.

Tobagi FA, Pang J. "StarWorks (Trademark)—A Video Applications Server," Proceedings, IEEE COMPCON 93, San Francisco, California, 1993, pp. 4–11.

Vaitzblit L, "The Design and Implementation of a High Bandwidth File Service for Continuous Media," Master's Thesis, Massachusetts Institute of Technology, Cambridge, Mass., Nov. 4, 1991.

\* cited by examiner

| VIRTUAL VOLUME No. | HOST PROCESS | FLAGS (SPARE/ VIRTUAL) | SPARE VOLUME No. | BACKUP VERSION No. | PRIMARY VOLUME No. |
|---|---|---|---|---|---|
| — | — | — | — | — | — |
| — | — | — | — | — | — |
| ⋮ | ⋮ | ⋮ | ⋮ | ⋮ | ⋮ |

*Fig. 14*

VIRTUAL STORAGE AND BLOCK LEVEL DIRECT ACCESS OF SECONDARY STORAGE FOR RECOVERY OF BACKUP DATA

FIELD OF THE INVENTION

The present invention relates generally to computer data storage backup, and more particularly, to a data storage system that provides backup of physical storage units with a minimum of host computer system involvement.

BACKGROUND OF THE INVENTION

Due to advances in computer technology, there has been an ever-increasing need for data storage in data processing networks. In a typical data processing network, there has been an increase in the number of volumes of data storage and an increase in the number of hosts needing access to the volumes. This has been especially true for networks of work stations. Not only have a greater number of workstations been added to the typical network, but also the increase in data processing capabilities of a typical workstation has required more data storage per workstation for enhanced graphics and video applications.

Fortunately for computer users, the cost of data storage has continued to decrease at a rate approximating the increase in need for storage. For example, economical and reliable data storage in a data network can be provided by a storage subsystem including a Redundant Array of Independent Disks (RAID). Presently it is practical to provide a single data storage subsystem with up to 20 terabytes (TB) of storage, or approximately 4000 logical volumes, using magnetic disk drives each having a storage capacity of 46 gigabytes.

Unfortunately for network administrators, the development of services for storage management has lagged behind the increase in storage to be managed. Consequently, the cost of storage management has become relatively more significant. More troubling is the difficulty of maintaining the same level of management service as the amount of storage increases. For example, users are accustomed to being provided with backup and restore services for their data that is stored on the network. Users are encouraged to store their data on the network so that it can be shared by other authorized users and maintained in a cost-effective manner in accordance with corporate document retention policies. However, data stored on the network is always subject to some chance of loss due to a severe failure of the data storage system. Backup and restore services are a conventional way of reducing the impact of data loss from the network storage. To be effective, however, the data should be backed up frequently, and the data should be restored rapidly from backup after the storage system failure. As the amount of storage on the network increases, it is more difficult to maintain the frequency of the data backups, and to restore the data rapidly after a storage system failure.

SUMMARY OF THE INVENTION

In accordance with one aspect of the invention, there is provided a method of permitting at least one host processor to obtain from a data storage subsystem access to backup versions. The data storage subsystem has primary data storage, and the backup versions are stored in secondary data storage linked to the data storage subsystem for transfer of the backup versions from the secondary data storage to the data storage subsystem. The method includes the host processor transmitting to the data storage subsystem a request for assignment of a virtual storage address from which a specified backup version in the secondary data storage can be accessed via storage access requests that are transmitted from the host processor to the data storage subsystem. The data storage subsystem responds to the request for assignment of a virtual storage address by assigning a virtual storage address from which the specified backup version in the secondary data storage can be accessed via storage access requests that are transmitted from the host processor to the data storage subsystem. The host processor accesses the specified backup version by transmitting to the data storage subsystem storage access requests that specify the assigned virtual storage address and that specify portions of the specified backup version to be accessed. The data storage subsystem responds to the storage access requests by accessing the specified portions of the specified backup version to be accessed.

In accordance with another aspect, the invention provides a machine-readable program storage device containing a program for a storage controller of a data storage subsystem permitting at least one host processor to obtain from the data storage subsystem access to backup versions that are stored in secondary data storage linked to the data storage subsystem for transfer of the backup versions from the secondary data storage to the data storage subsystem. The program is executable by the storage controller for receiving from the host processor a request for assignment of a virtual storage address from which a specified backup version in the secondary data storage can be accessed via storage access requests that are transmitted from the host processor to the data storage subsystem. The program is also executable by the storage controller for responding to the request for assignment of a virtual storage address by assigning a virtual storage address from which the specified backup version in the secondary data storage can be accessed via storage access requests that are transmitted from the host processor to the data storage subsystem. The program is further executable by the storage controller for receiving from the host processor storage access requests that specify the assigned virtual storage address and that specify portions of the specified backup version to be accessed, and for responding to the data storage access requests by accessing the specified portions of the specified backup version to be accessed.

In accordance with yet another aspect, the invention provides a machine readable program storage device containing a program for a storage controller for a data storage subsystem permitting at least one host processor to obtain from the data storage subsystem access to backup versions that are stored in secondary data storage linked to the data storage subsystem for transfer of the backup version from the secondary data storage to the data storage subsystem. The program is executable by the storage controller for receiving from the host processor a request for allocation of spare data storage from which a specified backup version can be accessed via storage access requests transmitted from the host processor to the data storage subsystem, and responding to the request from the host processor for allocation of the spare data storage by associating a virtual storage address with the specified backup version, and checking whether or not spare data storage is available in the data storage subsystem for storage of the specified backup version, and when spare data storage is available in the data storage subsystem for storage of the specified backup version, allocating the spare data storage for storing the specified backup version, mapping the virtual storage address to an address of the spare data storage allocated for storing the specified backup version, and transmitting a copy of the specified backup version from the secondary data storage to the spare data storage allocated for storing the specified backup version. The program is further executable by the storage controller for receiving from the host processor storage access requests specifying the virtual storage address; and responding to the storage access requests from the host processor by checking whether or not there is a mapping of the specified virtual storage address to data storage in the data storage subsystem, and when there is a mapping of the specified virtual storage address to data storage in the data storage subsystem, accessing the data storage in the data storage subsystem to which the virtual storage address is mapped, and when there is not a mapping of the specified virtual storage address to data storage in the data storage subsystem, then accessing the specified backup version associated with the virtual storage address by accessing the secondary data storage.

In accordance with still another aspect, the invention provides a data storage subsystem for permitting at least one host processor to obtain access to backup versions stored in secondary data storage. The data storage subsystem includes primary data storage and a storage controller coupled to the primary data storage for controlling access to the primary data storage. The storage controller has at least one data port for linking the primary data storage and the secondary data storage to the host processor for transfer of data between the primary data storage and the secondary data storage and the host processor. The storage controller is programmed for receiving from the host processor a request for assignment of a virtual storage address from which a specified backup version in the secondary data storage can be accessed via storage access requests that are transmitted from the host processor to the storage controller. The storage controller is also programmed for responding to the request for assignment of a virtual storage address by assigning a virtual storage address from which the specified backup version in the secondary data storage can be accessed via storage access requests that are transmitted from the host processor to the storage controller. The storage controller is further programmed for receiving from the host processor storage access requests that specify the assigned virtual storage address and that specify portions of the specified backup version to be accessed, and responding to the storage access requests by accessing the specified portions of the specified backup version to be accessed.

In accordance with a final aspect, the invention provides a data storage subsystem for permitting at least one host processor to obtain access to backup versions stored in secondary data storage. The data storage subsystem includes primary data storage and a storage controller coupled to the primary data storage for controlling access to the primary data storage. The storage controller has at least one data port for linking the primary data storage and the secondary data storage to the host processor for transfer of data between the primary data storage and the secondary data storage and the host processor. The storage controller is programmed for receiving from the host processor a request for allocation of spare data storage from which a specified backup version in the secondary data storage can be accessed via storage access requests transmitted from the host processor to the data storage subsystem, and for responding to the request from the host processor for allocation of the spare data storage by associating a virtual storage address with the specified backup version, and checking whether or not spare data storage is available in the data storage subsystem for storage of the specified backup version and when spare data storage is available in the data storage subsystem for storage of the specified backup version, allocating the spare data storage for storing the specified backup version, mapping the virtual storage address to an address of the spare data storage allocated for storing the specified backup version, and transmitting a copy of the specified backup version from the secondary data storage to the spare data storage allocated for storing the specified backup version. The storage controller is further programmed for receiving from the host processor storage access requests specifying the virtual storage address; and responding to the storage access requests from the host processor by checking whether or not there is a mapping of the specified virtual storage address to data storage in the data storage subsystem, and when there is a mapping of the specified virtual storage address to data storage in the data storage subsystem, accessing the data storage in the data storage subsystem to which the virtual storage address is mapped, and when there is not a mapping of the specified virtual storage address to data storage in the data storage subsystem, then accessing the specified backup version associated with the virtual storage address by accessing the secondary data storage.

BRIEF DESCRIPTION OF THE DRAWINGS

Additional features and advantages of the invention will be described below with reference to the drawings, in which:

FIG. 14 is a table representing information that defines a current allocation of virtual backup storage volumes;

Figure 1:
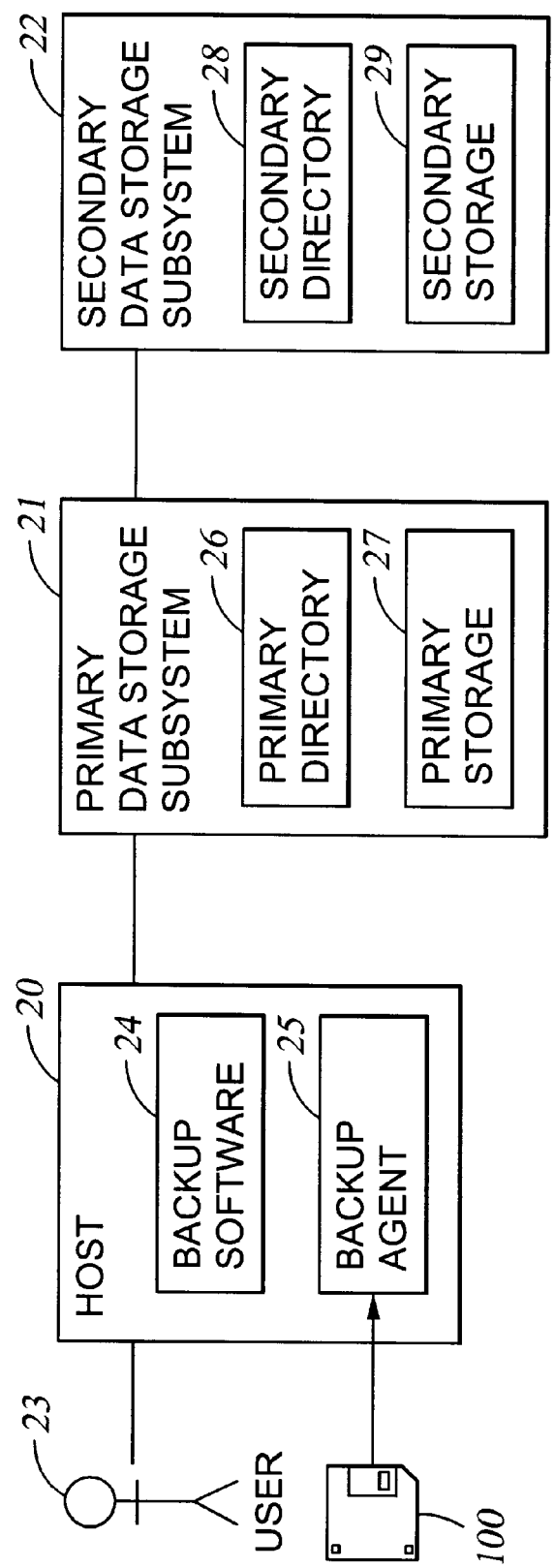
FIG. 1 is a block diagram of a data processing system in which the invention can be used.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

I. Structure and Operation of the Primary and Secondary Data Storaoe Subsystems

With reference to FIG. 1 of the drawings, there is shown a data processing system in which the present invention can be used. The data processing system includes a host computer 20, a primary data storage subsystem 21, and a secondary data storage subsystem 22. The host computer 20 is operated by a user 23, and during typical operation the host computer reads and writes to primary storage 27 in the primary data storage subsystem 21. In order to recover from a failure causing a loss of data in the primary storage 27, a backup copy of data in the primary storage 27 is kept in secondary storage 29 of the secondary data storage subsystem 22.

In the data processing system of FIG. 1, the backup data in the secondary storage 29 is not updated every time that the host 20 writes new data to the primary data storage subsystem. Instead, specified data in the primary storage 27 is copied to the secondary storage 29 when the primary data storage subsystem 21 receives a backup command from the host 20. The host 20 may issue such a backup command at the request of the user 23 or at the request of an application program being executed by the host. In either case, the host has backup software 24, which the user or the application program can invoke to cause the host to issue a backup command. The backup software 24, for example, translates requests to backup logical data structures, such as files, to backup commands that operate upon units of data storage specified in the backup commands transmitted by the host 20 to the primary data storage subsystem 21. For example, the units of data storage specified in the backup commands may include data storage volumes or devices, cylinders, and tracks.

In the context of this patent application, the term "physical storage unit" will refer to a storage unit specified by the backup commands received by the primary data storage subsystem 21. There may or may not be a one-to-one correspondence between such a physical storage unit specified in a backup command and a data storage device in the primary data storage subsystem. In the case where there is not such a one-to-one correspondence, the primary data storage subsystem will perform a mapping between the physical storage unit specified in the backup request and at least one address of a data storage device providing the primary storage 27 in the primary data storage subsystem 21.

In response to a backup command from the host 20, the primary data storage subsystem 21 accesses a primary directory 26 to find data of the physical storage unit specified by the backup command in order to initiate a process of copying the data from the primary storage 27 to the secondary storage 29 of the secondary data storage subsystem 22. Preferably, the primary directory 26 is constructed in such a way that the host can continue to access the primary storage 27 concurrently with the copying process. For example, in response to the backup command from the host 20, the primary data storage subsystem creates an "instant snapshot copy" of the specified physical storage unit, and this instant snapshot copy is protected from modification by the host 20 while the instant snapshot copy is being written to the secondary storage 29. There are a number of ways that such an instant snapshot copy can be created, depending on the way that the primary directory is organized.

One way of organizing the primary directory 26 is to associate a set of flags and mapping information with each physical storage unit, for example as described in Yanai et al., U.S. Pat. No. 5,206,939, issued Apr. 27, 1993, and incorporated herein by reference. In order to create an instant snapshot copy, a remote copy pending flag is associated with each physical storage unit. When the primary data storage subsystem 21 receives a backup command from the host 20, the primary data storage subsystem sets the remote copy pending flag, and thereafter the host can concurrently access the primary storage 27 while data is being copied from the physical storage unit to the secondary storage 29. However, before the primary data storage subsystem accesses the primary storage 27 to modify any data in response to a request from the host 20, the primary data storage subsystem first inspects the remote copy pending flag of the physical storage unit to be modified, and if the remote copy pending flag is set, the primary data storage subsystem must copy the data of the physical storage unit from the primary storage 27 to the secondary storage 29 and reset the remote copy flag, before modifying the data in the primary data storage subsystem. Unless there is such a request from the host for modification of data marked as "remote copy pending," the copying of data from the primary storage 27 to the secondary storage 29 is performed as a background process relative to host requests.

Another way of organizing the primary directory 26 is to maintain lists of pointers to primary storage locations of old and new versions of physical storage units. Whenever data in the primary storage is modified, the data is read from the primary storage locations containing the most current version, modified, and written to a different set of primary storage locations. This is known in the art as a "log structured file" approach. See, for example, Douglis et al. "Log Structured File Systems," COMPCON 89 Proceedings, Feb. 27–Mar. 3, 1989, IEEE Computer Society, p, 124–129, incorporated herein by reference, and Rosenblum et al., "The Design and Implementation of a Log-Structured File System," ACM Transactions on Computer Systems. Vol. 1, Feb. 1992. p. 26–52, incorporated herein by reference. In order to create an instant snapshot copy, the primary directory 26 includes a respective remote copy pending flag associated with the pointer to each version of each physical storage unit. In response to a backup command from the host 20, the primary data storage subsystem sets the remote copy flag. Thereafter, the primary data storage subsystem can modify the data of the physical storage unit in the primary storage in the usual fashion concurrently with the copying of snapshotted version of the data to the secondary storage, because the new version and the snapshotted version of the physical storage unit are stored in a different set of primary storage locations. Instead of being used to temporarily delay any modification access to a physical storage unit, the remote copy flag is used to indicate whether not the set of primary storage locations associated as ith an old version of a physical storage unit can be de-allocated after a modification access. After a modification access to a physical storage unit, the primary data storage subsystem 21 inspects the remote copy flag associated with the physical storage unit, and if the remote copy flag is not set, then the set of primary storage locations associated with the old version of the physical storage unit is de-allocated, for example, by placing a pointer to the set of the primary storage locations on a "free list". The de-allocated primary storage locations therefore become available for storing modified versions of physical storage units. If the remote copy flag is set, then the set of primary storage locations cannot be de-allocated until the data in the set of primary storage locations has been copied to the secondary storage 29. For example, when the remote copy flag of a set of primary storage locations is set, the pointer to the set of primary storage locations is placed on a remote copy list that is serviced as a background process relative to servicing host requests. After the data for the set of primary storage locations indicated by the pointer at the head of the remote copy list has been copied to the secondary storage 29, the set of primary storage locations is de-allocated and the pointer is removed from the head of the remote copy list.

Regardless of how the primary directory 26 is organized and how the instant snapshot process is performed, it is possible for the secondary storage 29 to contain more than one version of backup data for the same physical storage unit. In order to distinguish between different versions of backup data for the same physical storage unit, the primary data storage subsystem 21 appends an identification tag to the backup data transmitted from the primary data storage subsystem to the secondary data storage subsystem 22. The tag, for example, is supplied by the host 20 in the backup command transmitted by the host to the primary data storage subsystem 21. The tag could also include a date-time stamp generated by the primary data storage subsystem. In the secondary data storage subsystem 22, the tag associated with each version of backup data is stored in a secondary directory 28, which further includes a record of a set of locations of the secondary storage 29 in which the version of backup data is stored.

The tag associated with each version of backup data in the secondary storage 29 is used in a restore operation initiated by the backup software 24 in response to the user 23 or in response to a call from an application program executed by the host 20. The backup software 24 issues a restore command to the primary data storage subsystem 21, and the restore command contains the tag of a backup version to be restored. The primary data storage subsystem forwards the restore command to the secondary data storage subsystem 22. In response to the restore command the secondary data storage subsystem accesses the secondary directory 28 to find the secondary storage locations containing the version of backup data identified by the tag and then copies the version of backup data from the secondary storage 29 to the primary storage 27. Therefore, the version of the backup data identified by the tag becomes the current version in the primary storage 27. The primary data storage subsystem then transmits an acknowledgment of completion of the restore operation to the backup software 24 of the host 20.

The primary storage 27 and the secondary storage 29 may contain various kinds of data storage devices such as dynamic or static random access memory, magnetic or optical disk data storage, and magnetic or optical tape data storage. As will be further described below with reference to FIG. 3, the primary data storage subsystem 21, for example, is a cached disk data storage subsystem including a random access cache memory and magnetic disk data storage. As further described below with reference to FIG. 4, the secondary data storage subsystem 22, for example, includes a tape library unit containing a multiplicity of magnetic tape cassettes providing the secondary storage 29, and the secondary data storage subsystem 22 may also include a random access cache memory and magnetic disk memory for buffering backup data transferred between the primary data storage subsystem 21 and the secondary data storage subsystem 92, and for storing the information contained in the secondary directory 28.

Although the data processing system of FIG. 1 is shown to include a single user 23, a single host 20, a single primary data storage subsystem 21, and a single secondary data storage subsystem 22, it should be appreciated that economies of scale in the construction of the data storage subsystems provide an incentive for a multiplicity of hosts to share a primary data storage subsystem, and for a multiplicity of primary data storage subsystems to share a secondary data storage subsystem. Such a data processing system is shown in FIG. 2.

Figure 2:
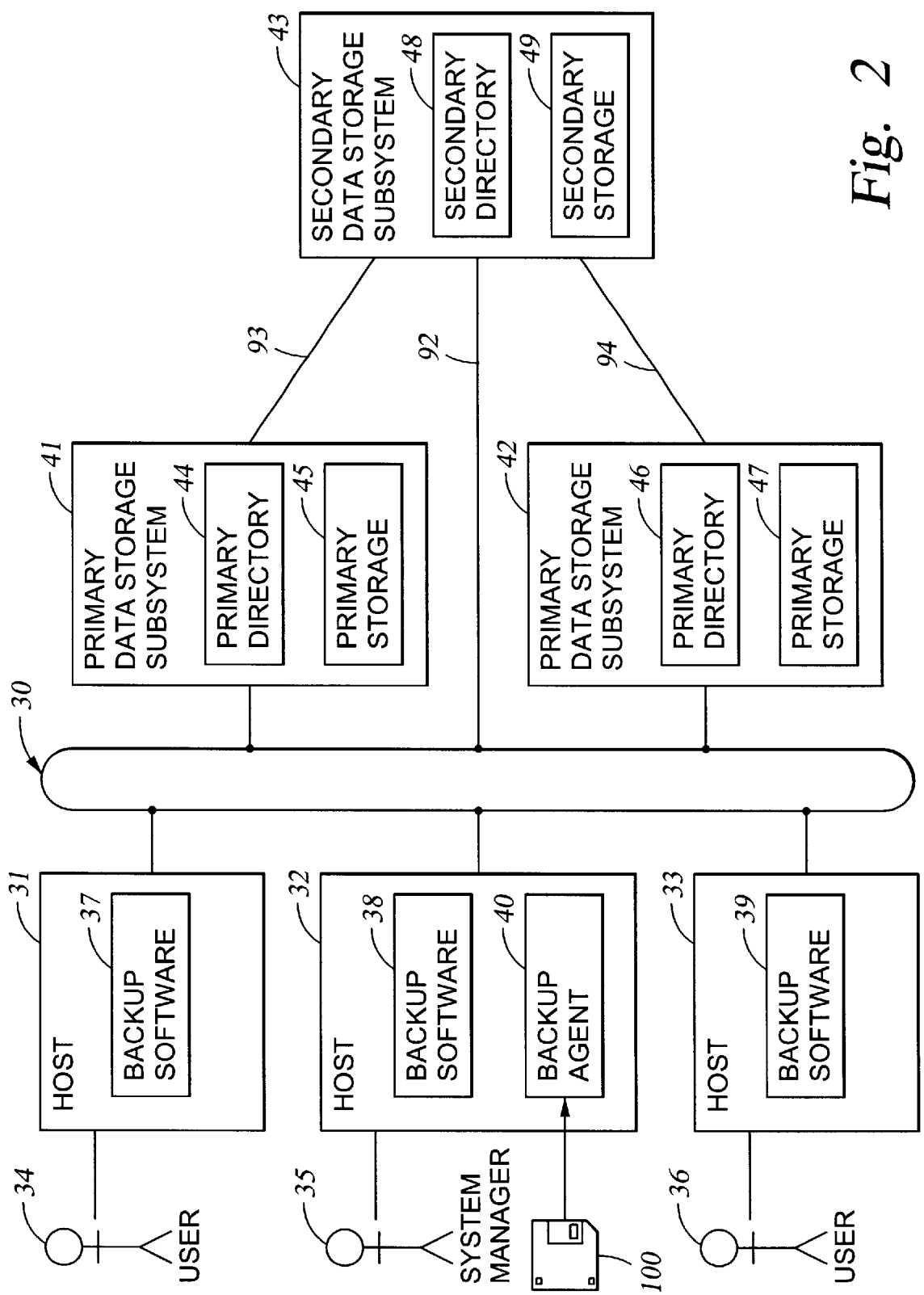
FIG. 2 is a block diagram of a more complex data processing system in which the invention can be used.

With reference to FIG. 2, a data network 30 such as a Fibre Channel loop links a multiplicity of hosts 31, 32, 33 to a number of primary data storage subsystems 41, 42. The hosts 31, 32, 33, for example, are workstations of respective users 34, 35, 36. The user 35 is a system manager responsible for configuring the data storage subsystems 41 42 and ensuring that the data storage and backup needs of the users are satisfied. Each of the hosts has a copy of backup software 37, 38, 39 similar to the backup software 24 described above with reference to FIG. 1. The primary data storage subsystems 41,42 each have a respective primary directory 44, 46 and respective primary storage 45, 47. The primary data storage subsystems 41, 42 are each similar to the primary data storage subsystem 21 of FIG. 1. The primary data storage subsystems 41, 42 share a secondary data storage subsystem 43. The secondary data storage subsystem 43 has a secondary directory 48 and secondary storage 49. The secondary data storage subsystem 43 is similar to the secondary data storage subsystem 22 of FIG. 1, but it further includes independent, dedicated data links 93 and 94 to each of the primary data storage subsystems 41 and 42, and a data link 92 to the data network 30. The dedicated links 93, 94 are used for transferring backup data between the respective primary data storage subsystems 41, 42 and the secondary data storage subsystem 43. The data link 92 permits the system manager 35 to access the secondary data storage subsystem 43 for data storage management and diagnostic purposes.

Figure 3:
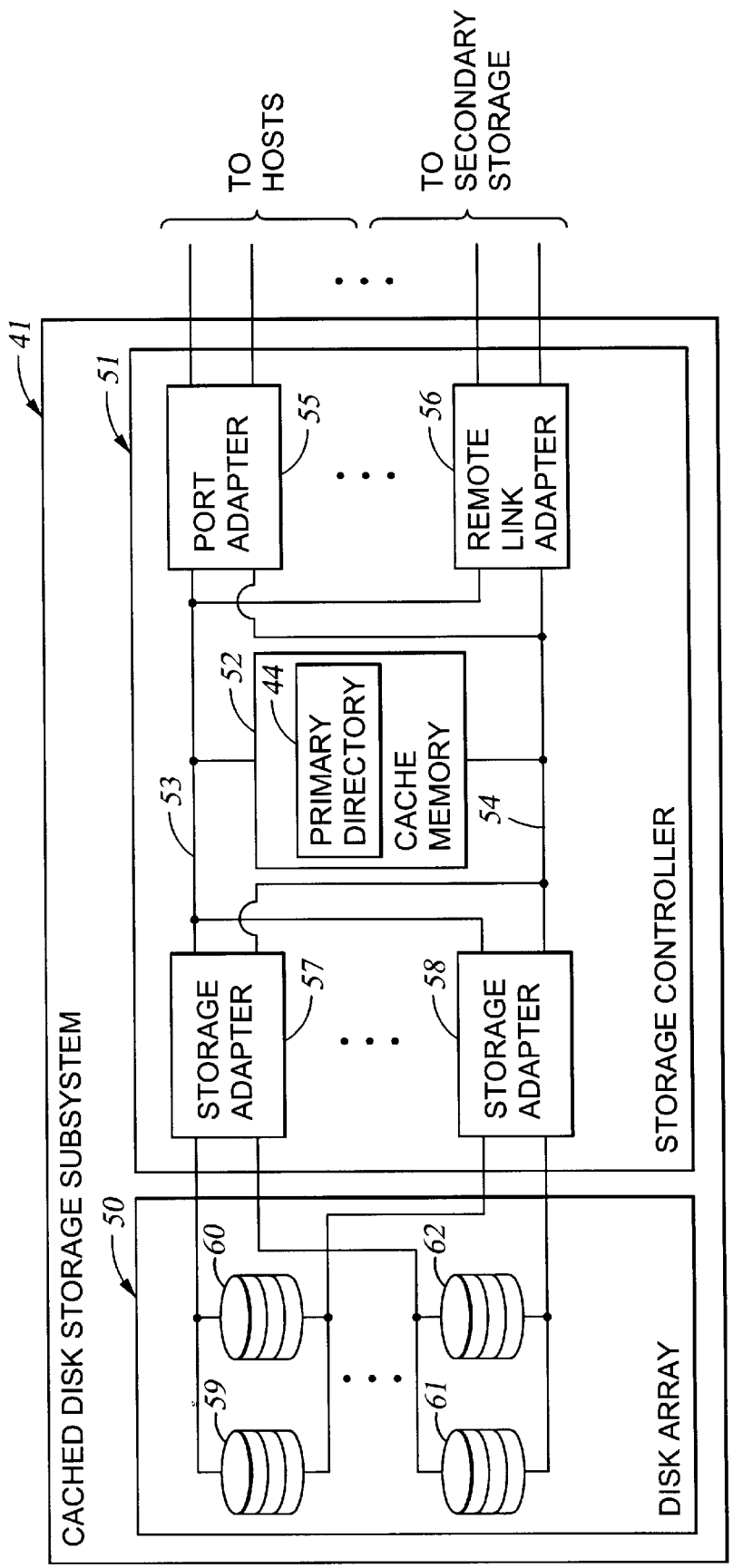
FIG. 3 is a block diagram of a preferred construction for the primary data storage subsystem in the data processing system of FIG. 2.

With reference to FIG. 3 there is shown a preferred construction for the primary data storage subsystems in the data processing system of FIG. 2. The primary data storage subsystem 41 is a cached disk data storage subsystem including a disk array 50 and a data storage controller 51 for controlling access of the hosts to the disk array. The disk array includes a multiplicity of magnetic disk drives 59.60, 61,62. Using current technology, each of the disk drives has a data storage capacity of at least 47 gigabytes, and the primary data storage subsystem provides at least 20 terabytes (TB) of data storage.

The data storage controller 51 includes a dual port cache memory 52, a number of port adapters 55, a number of remote link adapters 56, and a plurality of storage adapters 57, 58. The cache memory 52 is accessed via any one of two back-plane busses 53, 54. Each port adapter 55 links the hosts, via the network 30 in FIG. 2, to each of the two back-plane busses 53, 54. Each remote link adapter 56 links the secondary data storage subsystem to each of the two back-plane busses. Each of the storage adapters 57, 58 links a respective set of the disk drives 59, 60, 61, 62 to each of the two back-plane busses 53, 54. For example, the cached disk data storage subsystem includes up to eight storage adapters, and a total of up to eight port or remote link adapters. Each port adapter provides two independent data ports to the data network, and each remote link adapter provides two independent data ports to one or two secondary data storage subsystems.

When a port adapter 55 receives a data storage access request from one of the hosts (31, 32, 33 in FIG. 2), the port adapter accesses the primary directory 44 in the cache memory 52 to determine whether or not the data to be accessed resides in the cache memory. If the data to be accessed resides in the cache memory, then the port adapter accesses the data in the cache memory. If the data to be accessed does not reside in the cache memory, then the port adapter forwards a data storage access request to the storage adapters 57, 58. One of the storage adapters 57, 58 responds to the data storage access request by performing a mapping to determine where the data to be accessed resides on the data storage devices and reads the data from the data storage devices and writes the data to the cache memory, for access by the port adapter. The storage adapters 57, 58 also perform a write-back operation to ensure that data written to the cache memory 52 by the port adapters eventually becomes written to the disk array 50.

The cache memory 52 ensures that data frequently accessed by the hosts is likely to be found in cache in order to avoid the data access time of the disk drives and in order to minimize loading on the storage adapters and the port adapters. Consolidation of network data storage into a large cached data storage subsystem provides a benefit that cache resources are consolidated into one large cache, which is more efficient than a number of smaller caches having in Total the same cache memory capacity. A large cache is more likely to contain the most recently accessed data than the combined cache memory of the smaller caches.

The data storage subsystem 41 is constructed for high data availability so that a single high-capacity data storage subsystem is at least as fault-tolerant as a local collection of conventional network data storage servers. Fault tolerance is ensured by dual redundant components and busses in the path from each port adapter 55 to any one of the disk drives 59, 60, 61, 62. Mirroring or RAID (redundant array of inexpensive disks) techniques ensure that the storage adapters 57, 58 can recover data in the event of failure of any one of the disk drives. See, for example, Patterson et al., "Introduction to Redundant Arrays of Inexpensive Disks (RAID))," COMPCON 89 Proceedings, Feb. 27–Mar. 3, 1989, IEEE Computer Society, p. 112–117, incorporated herein by reference. In a similar fashion, the data network (30 in FIG. 2) can be made fault tolerant by ensuring that each of the hosts (31, 32, 33) has more than one independent path through the data network 30 to each of two port adapters in the data storage subsystem 41. For example, the data network 30 in FIG. 2 could have dual redundant Fibre-Channel loops, only one being shown in FIG. 2.

In a preferred form of construction, the cache memory 52 is composed of dynamic RAM memory cards mounted in a card-cage or main-frame, and the port adapters and storage adapters are programmed micro-processor cards that are also mounted in the card-cage or main-frame. Each port adapter 55 has one or more processors for handling the communication protocol of the data network (30 in FIG. 2) and communicating with the cache memory busses 53, 54. Each remote link adapter 56 has one or more processors for handling a communications protocol with the secondary data storage subsystem. Each storage adapter 57, 58 has one or more processors for handling the communication protocol of the disk drives and for communicating with the cache memory busses 53, 54. For example, the links between the storage adapters 57, 58 and the disk drives are FWD (fast, wide, differential) SCSI or Fibre Channel fiber-optic loops, the port adapters 55 are programmed to communicate with the network and hosts via Bus and Tag CKD, ESCON, or SCSI protocols, and the remote link adapters 56 are programmed to communicate with the secondary data storage subsystem using the ESCON protocol.

Further details regarding the preferred construction and operation of the cached disk data storage subsystem 41 are disclosed in Yanai et al. U.S. Pat. No. 5,206,939, issued Apr. 27, 1993; Yanai et al. U.S. Pat. No. 5,335,352, issued Aug. 2 1994; and Yanai et al. U.S. Pat. 5,381,539, issued Jan. 10, 1995; all incorporated herein by reference. The operation of the remote link adapter 56 is further described in Yanai et al., U.S. Pat. No. 5,544,347 issued Aug. 6, 1996, incorporated herein by reference, and in Yanai et al., U.S. Pat. No. 5,742,792 issued Apr. 1, 1998 (Ser. No. 08/654,511 filed May 28, 1996), incorporated herein by reference. Yanai et al. U.S. Pat. No. 5,544,347 and 5,742,792 describe the use of the remote link adapter for automatic remote mirroring of data. The use of the remote link adapter for backup of data is similar to the use of the remote link adapter for automatic remote mirroring of data with the exception that automatic remote mirroring of data need not maintain multiple versions of data in the secondary storage and therefore need not use a tag for identifying any particular version of the mirrored data.

Figure 4:
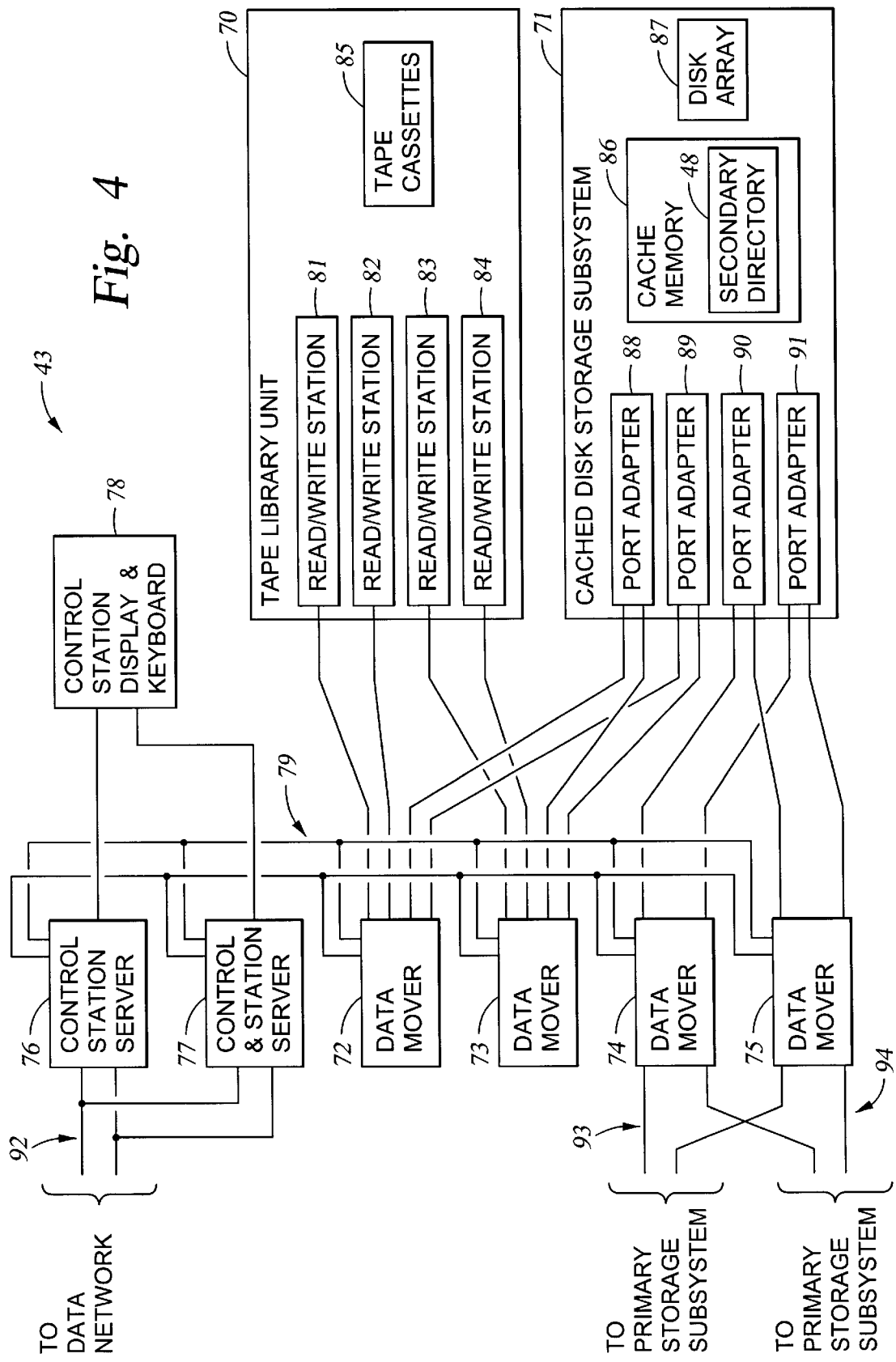
FIG. 4 is a block diagram of a preferred construction for the secondary data storage subsystem in the data processing system of FIG. 2.

Referring to FIG. 4, there is shown a block diagram of a preferred construction of the secondary data storage subsystem 43 in FIG. 2. As shown in FIG. 4, the secondary data storage subsystem includes a tape library unit 70, a cached disk data storage subsystem 71, a plurality of data mover computers 72, 73, 74, 75, dual redundant control station server computers 76, 77, and a control station display and keyboard 78. The data mover computers 72–75 and the control station server computers 76–77 are linked for transfer of control and status information by a dual redundant 10-Base-T bus 79.

The tape library unit 70 has a plurality of read-write stations 81, 82, 83 84 and a robotic mechanism (not shown) for mounting and unmounting magnetic tape cartridges onto the read-write stations and removing or inserting the tape cartridges from slots in data storage shelves. The robotic mechanism operates automatically in response to mount, unmount, read, and write commands received by the read/write stations. The tape library unit 70, for example, is an ATL (Trademark) brand of tape library unit.

The cached disk data storage subsystem 71 includes a cache memory 86 providing a secondary directory 48 for the secondary data storage subsystem 43, a disk array 87, and a plurality of port adapters 88, 89, 90, and 91. The cached disk data storage subsystem 71 is similar to the data storage subsystem shown in FIG. 3, except that it need not have a remote link adapter. The cached disk data storage subsystem 71, for example, is a SYMMETRIX (Trademark) brand of data storage subsystem, sold by EMC Corporation, 171 South Street, Hopkinton, Mass., 01749. The cached disk data storage subsystem 71 functions as a data buffer for the tape library unit 70, as further described in Vikshlitzky et al., U.S. Pat. No. 5,737,747 issued Apr. 7, 1998, incorporated herein by reference.

The data mover computers 72–75 and the control station servers 76–77 are commodity personal computers. The data mover computers 74, 75 provide a front-end for the secondary data storage subsystem 43, and they are programmed to respond to backup and restore commands from the primary data storage subsystems. In response to a backup request, a front-end data mover computer 74, 75 moves the backup data to the cached disk data storage subsystem 71, updates the secondary directory 48, and initiates the transfer of the backup data from the cached disk data storage subsystem 71 to the tape library unit 70. The actual transfer of the backup data from the cached disk data storage subsystem 71 to the tape library unit 70 is performed by one of the back-end data mover computers 72, 73. In response to a restore request, a front-end data mover computer 74, 75 accesses the secondary directory 48 to determine the most accessible source of the backup data (cache memory 86, disk array 87, or tape cassettes 85), and accesses the backup data from the cache memory 86 or the disk array 87, or if the backup data is not accessible from the cache memory 86 or the disk array 87, the front end data mover sends a command over the 10-Base-T bus 79 to one of the back-end data mover computers 72, 73 to read the backup data from the tape cassettes and transfer the data from the tape cassettes to the cache memory 86 in the cached disk data storage subsystem 71. Once at least a portion of the backup data has been transferred from tape 85 to the cache 86, the front-end data mover computer 74, 75 transfers the backup data from the cache memory 86 to the primary data storage subsystem having issued the restore request.

II. Physical Backup and Logical Restore.

As described above with reference to FIGS. 1 to 4, a primary data storage subsystem and a secondary data storage subsystem have been constructed to rapidly respond to a physical backup request for backup of a physical storage unit such as a volume or cylinder. A user, however, may request backup of a logical data structure such as a file having a rather complex mapping to a number of physical storage units such as a number of tracks. The backup software in a host could perform such a backup by performing a logical-to-physical translation or mapping of the file name into a list of tracks that comprise the file. The backup software could then cause the host to issue a series of backup commands to the primary data storage subsystem containing the file to be backed up. The series of backup commands could include a separate backup request for each of the tracks comprising the file. The series of backup commands for any single logical data structure could be chained for execution by the primary data storage subsystem as a single transaction to ensure that a backup of the entire logical data structure would be made before any part of it is possibly modified. In other words, the backup commands could be chained to ensure consistency of the data in each backup version.

It has been discovered that the performance of a logical-to-physical translation for backup of a series of physical storage units comprising a logical data structure introduces needless complexity in host processing and can introduce a performance limitation in a primary data storage subsystem that has been constructed to rapidly respond to a backup request for backup of a physical storage unit. The host must suspend execution of application programs while the backup software is performing such a logical-to-physical translation. When the series of backup requests are chained to ensure consistency of the backup version, concurrent read-write access to the logical data structure is disrupted while the primary data storage subsystem executes the backup command chain. The host must also burden the primary data storage subsystem with a series of backup requests for the physical components of the logical data structure. The primary data storage subsystem, however, can rapidly perform an instant snapshot copy of a relatively large physical storage unit containing the entire logical data structure, without disrupting concurrent read-write access to the physical storage unit.

Figure 5:
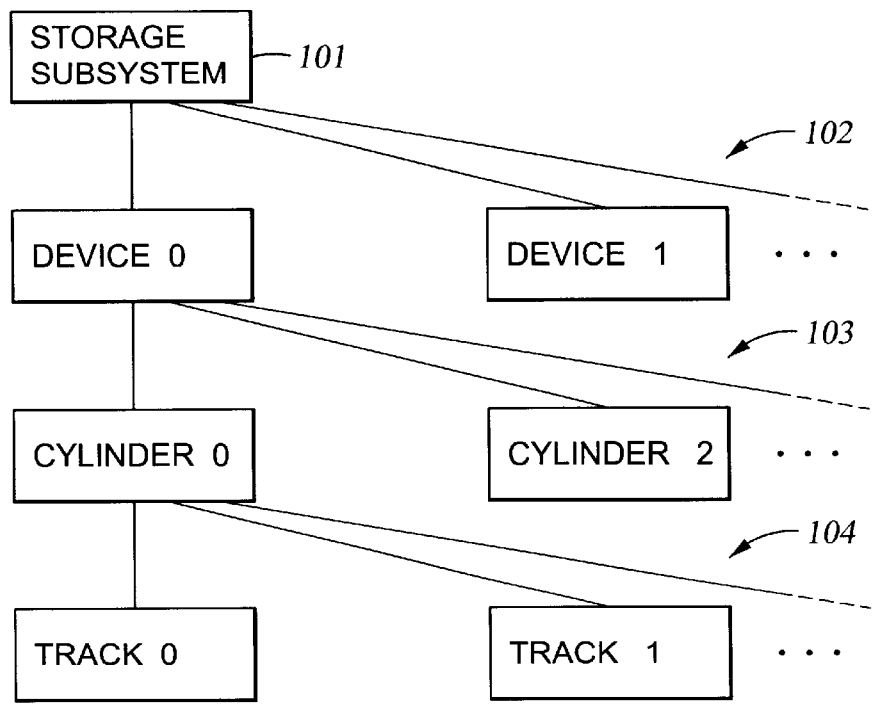
FIG. 5 is a block diagram of a hierarchy of physical storage units.

In accordance with a method of physical backup and logical restore, a request from a user or host program for backup of a logical data structure containing a series of physical storage components is performed by issuing a backup command to a primary data storage subsystem for backup of a physical storage unit containing the physical storage components of the logical storage unit. For example, the physical storage units are arranged in a hierarchy, and the request for backup of the logical data structure is processed by selecting from the physical storage unit hierarchy the smallest physical storage unit containing the physical storage components of the logical data structure. Shown in FIG. 5, for example, is a conventional physical storage unit hierarchy, in which the data storage 101 of a data storage subsystem is subdivided into devices or volumes 102, each device is subdivided into a number of cylinders 103, and each cylinder is subdivided into a number of tracks 104. This conventional data storage hierarchy could be extended to include finer levels of granularity, for example, a logical storage unit specified by a backup command could include any specified set of contiguous tracks, or any specified set of contiguous cylinders.

In general, certain kinds of logical data structures translate to one corresponding physical storage unit, and others do not. For example, file systems, data bases, and data base tables are logical data objects that translate to one corresponding physical storage unit, but individual files, file system or database directories, or database table entries do not translate to one corresponding physical storage unit. Therefore, if a user requests backup of a file or file directory, then the physical storage unit containing the file system of the file or file directory will be backed up instead of just the physical storage units containing the file or directory. In a similar fashion, if the user requests backup of a database table entry or database directory, then the physical storage unit containing the database table including the database entry or the database including the database directory will be backed up.

Figure 6:
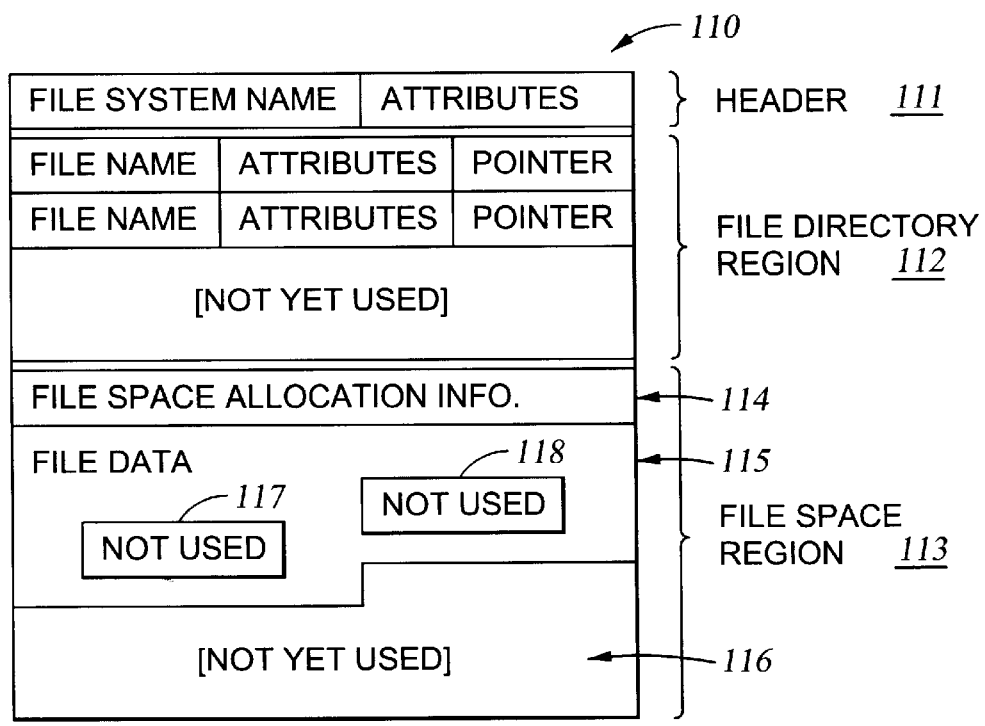
FIG. 6 is a storage map of a file system.

FIG. 6 more particularly shows logical data structures found within a file system generally designated 110. A physical storage unit, such as a cylinder, is allocated to the file system 110. The file system 110 is partitioned into a number of fixed size regions including a header 111, a file directory region 112, and a file space region 113. The header 111 includes a file system name and file system attributes. The file system attributes, for example, include the size of the file system, whether or not the file system is a read-only file system or a read-write file system, and a date-time stamp indicating when the file system was created or last modified. For backup and restore purposes, the file system header 111 may also include space for storing the tag for the backup version, including a version name and a date-time stamp indicating when the backup version was created, and an expiration date.

The file directory region 112 is a table space for file information including an entry for each file or subdirectory in the file system. Each entry includes a file or subdirectory name, attributes of the file, and a pointer to a starting location in the file space region 113 where data of the file begins. The attributes of the file, for example, include the size of the file or subdirectory, whether or not the file or subdirectory is a read-only file system, and a date-time stamp indicating when the file or subdirectory was created or last modified. For backup and restoration purposes, the attributes may include a retention life-time associated with the backup version of the file or subdirectory.

The file space region 113 includes a fixed amount of data storage for file space allocation information 114, a portion of the file space region currently containing file data, and a free contiguous data storage space region 116 at the end of the file space region 113 and not yet containing file data. Fixed-size blocks of data storage in the file space region 113 are dynamically allocated to the variable-size files, and due to the deletion of files from the file system 110, there can be a number of blocks 117, 118 that do not contain valid file data and that are within the portion of the file space region 115 that currently contains file data. Since the files are variable length and the length may increase as a result of modification by a write operation, the file data for each file is organized as a linked list in the file space region 113. The linked-list nature of the file data for each file complicates the logical-to-physical translation process of copying a specified file out of the file system 110. The file space allocation information 114 identifies the blocks in the file space region 113 that do not contain valid data, and also identifies the extent of the free contiguous data storage space 116 at the end of the file space region 113.

The method of backing up a physical storage unit containing the components of the logical data structure may appear to be undesirable because the backup data storage needed for data storage of the physical storage unit is most often greater than the total data storage of the components. In practice, however, the additional backup data storage for practicing this method is more than offset by the reduction of complexity of logical-to-physical translation prior to backup, and the enhancement of performance obtained when practicing this method. The cost of the additional backup data storage such as magnetic tape cassettes, is relatively low in comparison to the high cost of primary storage. The performance of primary storage is often the most important specification for the data processing system due to the desire to concentrate the primary storage in as few primary data storage subsystems as possible in order to reduce the cost of data storage management.

The amount of additional backup data storage needed for practicing the method of backing up a physical storage unit containing the components of the logical data structure can also be reduced by changing current backup practices. For example, users should be encouraged to include in each backup request all of the related data structures that they wish to back up. In particular, if a user requests backup of a file or file system directory, the user may be prompted to select other files in the file system to be backed up, since a backup copy of the entire file system will be made. The amount of additional backup data storage can also be reduced by performing additional procedures before the issuance of the backup commands to the primary data storage subsystem. In general, the changes in backup practices and the additional procedures performed before issuance of the backup commands have the effect of bundling multiple user and host program backup requests into respective backup commands. For example, if a user asks for a number of files to be backed up, then the backup software will group the files into file systems and issue only one backup command for each physical storage unit containing one or more of the file systems. The amount of additional backup data storage can also be reduced by performing procedures after the backup data has been written from the primary data storage subsystem to the secondary data storage subsystem. In general, the additional procedures performed after the backup data has been written from the primary data storage subsystem to the secondary data storage subsystem have the effect of compaction.

Compaction procedures can easily reduce the amount of required backup data storage by any excess data storage in the physical storage unit over the size of a file system or database contained in the physical storage unit, and can also easily reduce the amount of the required backup data storage by the amount of any contiguous free data storage at the end of the file system or database (such as the not yet used file space 116 shown in the file system 110 of FIG. 6). For example, the secondary data storage subsystem 43 in FIG. 4 can perform these compaction procedures while writing backup data from the cached disk data storaoe subsystem 71 to the tape library unit 70, and at the same time insert the backup tag into the header of the file system or database. A specific example is shown in the flowchart of FIG. 7.

Figure 7:
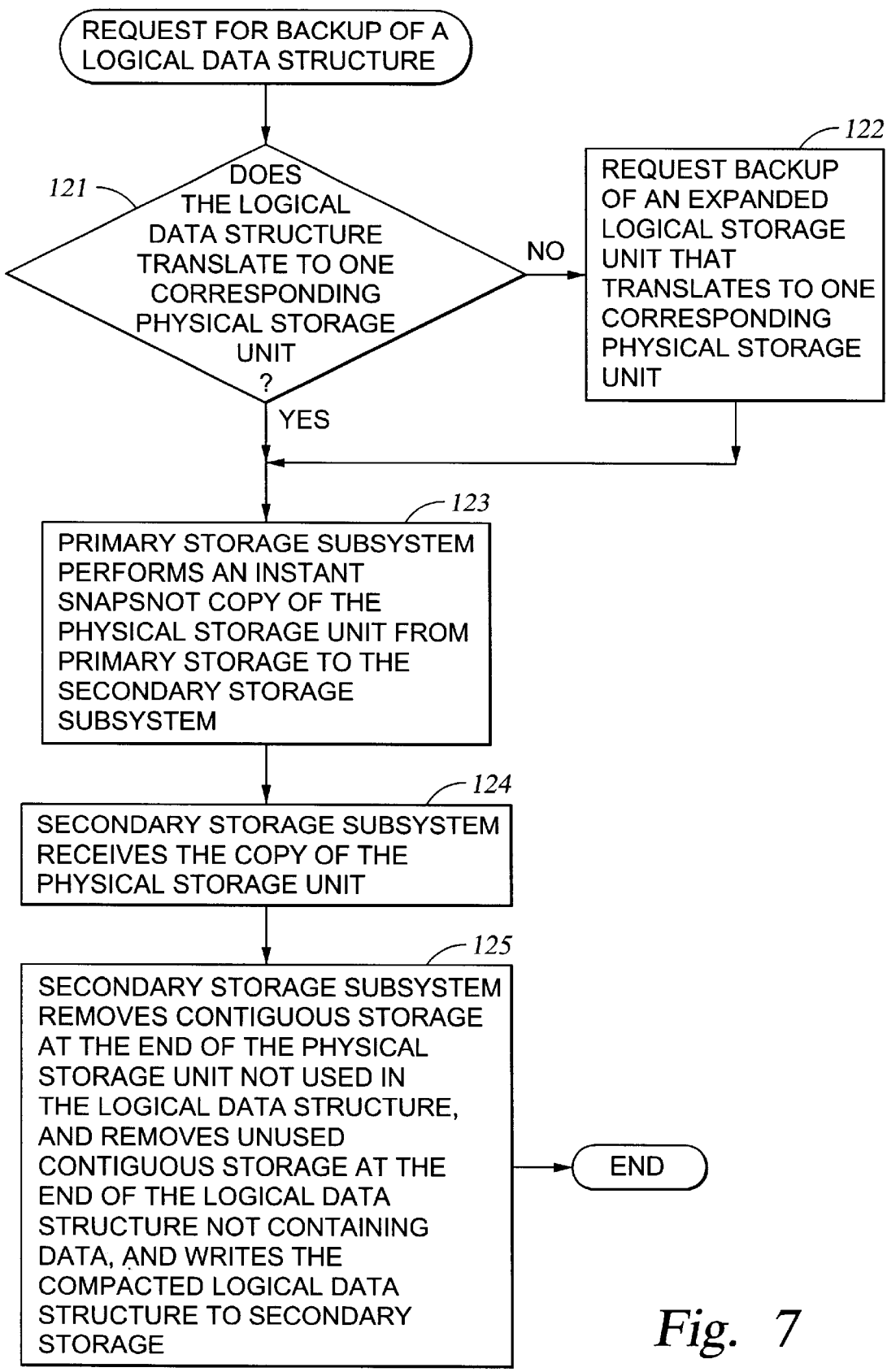
FIG. 7 flowchart of a physical backup procedure showing expansion and compaction operations.

With reference to FIG. 7, in response to a request from a user or application program for backup of a logical data structure, expansion is performed if the logical data structure specified by the user or application program does not translate to one corresponding physical storage unit. In this case, the control flow branches from step 121 to 122. In step 122, the request is modified so that the primary data storage subsystem is requested to back up an expanded logical storage unit that translates to one corresponding physical storage unit. For example, if the user request backup of a file, the execution branches from step 121 to step 122, and in step 122, the primary data storage subsystem is requested to back tip the file system containing the file. In step 123, the primary data storage subsystem performs an instant snapshot copy of the physical storage unit from primary storage to the secondary data storage subsystem. In step 124 the secondary data storage subsystem receives the copy of the physical storage unit. Finally, in step 125, the secondary data storage subsystem removes contiguous data storage at the end of the physical storage unit not used in the logical data structure, and removes unused contiguous data storage at the end of the logical data structure not containing data, and writes the compacted logical data structure to secondary storage. In effect, the compaction process in step 125 involves locating the end of useful data in the physical storage unit, terminating the process of writing the physical storage unit to secondary storage such as tape when reaching the end of the useful data, and recording in the secondary directory 48 the extent of the file data written to the tape.

More complicated compaction procedures may use a logical-to-physical translation to remove unused space within file data (such as the not yet used blocks 117 and 118 in FIG. 6) and to delete expired files and remove the file space of the deleted files. These more complicated compaction procedures, for example, can be performed in the secondary data storage subsystem as a background process, as will be further described below with reference to FIG. 10.

Although a logical-to-physical translation of a logical data structure into a series of component physical storage units is avoided during backup, it is still desirable to perform such a translation during a restore operation. In other words, it is desirable for the data processing system to provide a physical backup and logical restore. For example, although an entire file system will be backed up if a user needs to backup just a single file in the file system, the user may later request any specified file in the file system to be restored. Although this may be seen as a deferral of the complex process of a logical-to-physical translation of the logical data structure into a series of component physical storage units, in practice backup data is very infrequently restored so that there is an insignificant cost and performance degradation associated with the translation process.

When a backup operation is performed, it is desirable to perform a cataloging process with respect to the physical storage unit specified by the backup command in order to preserve historical information about the logical data structures contained in the physical storage unit. This catalog identifies the logical data structures that can be logically restored from the physical storage unit. The catalog need not contain mapping information about where the respective components of the logical data structures are located in the physical storage unit. This mapping information could be retained in data storage local to the host or could be backed up in the physical storage unit. For example, if a file system is being backed up, the physical storage unit containing the file system could include a file directory including a list of file names, historical information associated with the files, and the mapping information associating each file name with a respective list of the component physical storage units (i.e., a list of physical tracks) of each file as those physical storage components are found in the physical storage unit specified by the backup request. The historical information would indicate the time when each of the files was created or last modified. If the mapping information for the files is retained in the backed-up file system, it is also possible for the secondary data storage subsystem to use the mapping information in a background compaction process. This compaction process, for example, could delete files that the user or application program did not request to back up, but that were nevertheless backed up as part of the file system. Such a compaction process, as further described below with reference to FIG. 10, would also change the catalog information and the mapping information associated with the file system, and the new catalog and mapping information would be used in any logical restoration from the file system.

In a preferred embodiment, the physical backup and logical restore operations with respect to primary storage in a primary data storage subsystem are coordinated by a backup agent program providing an interface between backup software and the primary data storage subsystem, in the data processing system of FIG. 1, for example, such a backup agent 25 is executed by the host 20. Backup software typically is interfaced to a primary data storage subsystem 21 through an application program interface (API). The backup software calls the API, and in response the API issues a backup or restore command to the primary data storage subsystem. In contrast, in the data processing subsystem of FIG. 1, the backup software 24 calls the backup agent for a physical backup or logical restore operation, and the backup agent calls the API that issues the backup and restore commands to the primary data storage subsystem 21. The backup agent 25, and modifications to the backup software 24 for interfacing the backup software to the backup agent, could be loaded into the host 20 from a program storage device, such as a floppy magnetic disk 100. In this fashion, the floppy magnetic disk 100 could include new programming that would permit conventional backup software to be modified for practicing the present invention.

In the example of FIG. 2, the backup software 37, 38, 39 executed by each respective host 31, 32, 33 calls a backup agent 40 executed by the host 32 used by the system manager 35. In response to a call from the backup software in any of the hosts, the backup agent 40 issues a backup or restore command to either the primary data storage subsystem 41 or the primary data storage subsystem 42, depending on which of the primary data storage subsystems is assigned to store the data to be backed up or restored. The backup agent 40, and modifications to the backup software 38 for interfacing the backup software to the backup agent, could be loaded into the host 20 from a program storage device, such as the floppy magnetic disk 100.

Figure 8:
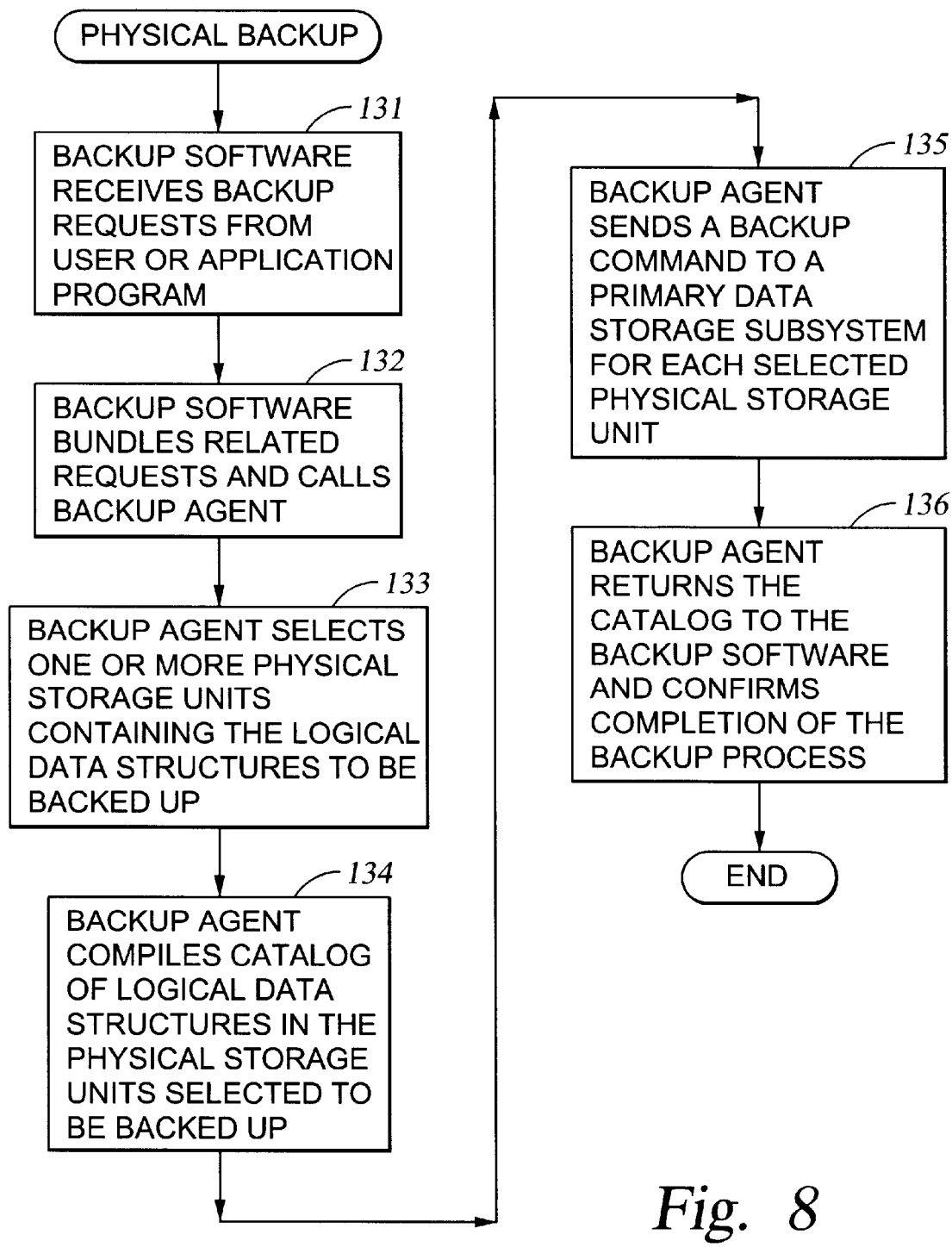
FIG. 8 flowchart of a physical backup procedure used by backup software and a backup agent.

With reference to FIG. 8 there is shown a flowchart of a specific example of how the backup software and the backup agent perform a physical backup operation. In a first step 131, the backup software receives one or more backup requests from a user or an application program. Next, in step 132 the backup software bundles related requests, and then calls the backup agent for each set of related requests. This bundling of related requests is done in order to possibly eliminate a need for subsequent backup of a physical storage unit, for example, by backing up one larger physical storage unit instead of two smaller physical storage units, or by backing up one version of a physical storage unit containing two logical data structures instead of backing up one version of a physical storage unit in order to back up one of the logical data structures and backing up another version of the same physical storage unit in order to back up the other logical data structure. For example, if the backup software receives a list of file names, then the backup software will group the file names in terms of the file systems that contain them. For each file system, the backup software may also request the user to enter or select from a file directory the names of any other files of the file system that the user would like to back up. An application program may automatically submit bundled requests, for example, by searching for file systems that have been modified since a previous backup, and for each file system that has been modified since a previous backup, searching for the files that have been modified since the previous backup, and calling the backup agent for backing up the files in the file system.

In step 133, the backup agent selects one or more physical storage units containing the logical data structures to be backed up. For example, for each file system, the backup agent selects the physical storage unit allocated to the file system. In step 134, the backup agent compiles a catalog of logical data structures in each physical storage unit selected to be backed up. For example, if the physical storage unit contains a file system, then the file system directory is accessed to obtain a list of the files in the file system and the respective date-time stamps of the files. In step 135, for each selected physical storage unit, the backup agent sends a backup command to a primary data storage subsystem. Finally, in step 136, the backup agent returns the catalog to the backup software and confirms completion of the backup process upon receiving an acknowledgment of successful completion from the primary data storage subsystem. The catalog includes the backup tag identifying the backup version and the date-time stamp of the backup. The backup software can therefore use the catalog to search for a consistent set of replacement data structures for recovery from data storage corruption. The backup software could also use the catalog to avoid unnecessary backup of data that has not been modified since a previous backup.

Figure 9:
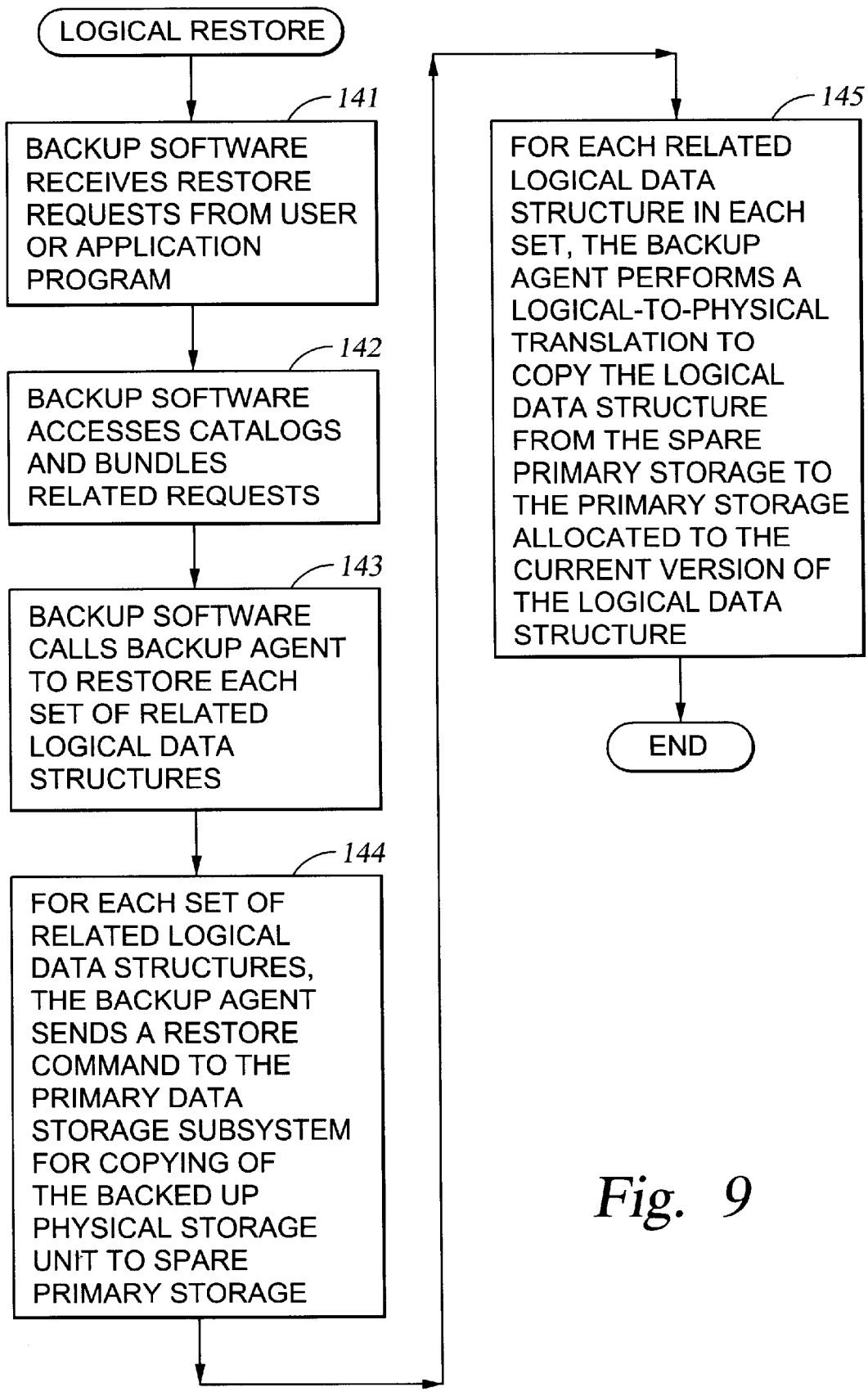
FIG. 9 is a flowchart of a logical restore procedure used by backup software and a backup agent.

With reference to FIG. 9, there is shown a flowchart of a specific example of how the backup software and the backup agent perform a logical restore operation. In a first step 141, the backup software receives one or more restore requests from a user or application program. Then in step 142, the backup software accesses the catalogs pertaining to logical data structures specified by the restore requests, in order to bundle the requests in terms of the backed-up physical storage units containing the specified logical data structures. In other words, the logical data structures that can be restored from the same version of a backed-up physical storage unit are included in the same bundle. This is done so that all of the logical data structures in the same bundle can be sequentially copied out of spare primary storage loaded with one copy of the backed-up version of the physical storage unit. The bundling process could be done, for example, by the user or an application program first selecting a catalog and then selecting a set of logical data structures from each catalog. In step 143, for each set of related logical data structures, the backup software calls the backup agent to restore the bundled logical data structures. In step 144, for each set of related logical data structures, the backup agent sends a restore command to the primary data storage subsystem for copying of the backed-up physical storage unit from secondary storage to spare primary storage. Finally for each related logical data structure in each set, in step 145 the backup agent performs a logical-to-physical translation to copy the logical data structure from the spare primary storage to the primary storage allocated to the current version of the logical data structure. In the process, the current version of the logical data structure is deleted and replaced with the backup version from the spare primary storage. For example, when restoring files from a file system, the backup agent may copy the backup version of the file system to spare primary storage by using file code on the host to mount the file system in a spare volume of primary storage, and then by using file code on the host to copy out each file from the spare volume. The file code on the host, for example, reads the file system directory to find the starting location of the file data of the file, and then interprets the linked-list structure of the file data to stream the file data from the copy of the backed-up file system in the spare primary storage to the current file system in the primary storage, and to create a new linked list in the current file system in the spare primary storage, and to update the file directory of the current file system in the primary storage. As another example, to restore some data from a particular table space of a database, the backup agent may copy the backup version of the file system to spare primary storage, and then invoke a database application program to restore the database in its entirety in spare primary storage, and use utilities in the database application program to copy out the data from the particular table space of the database.

Figure 10:
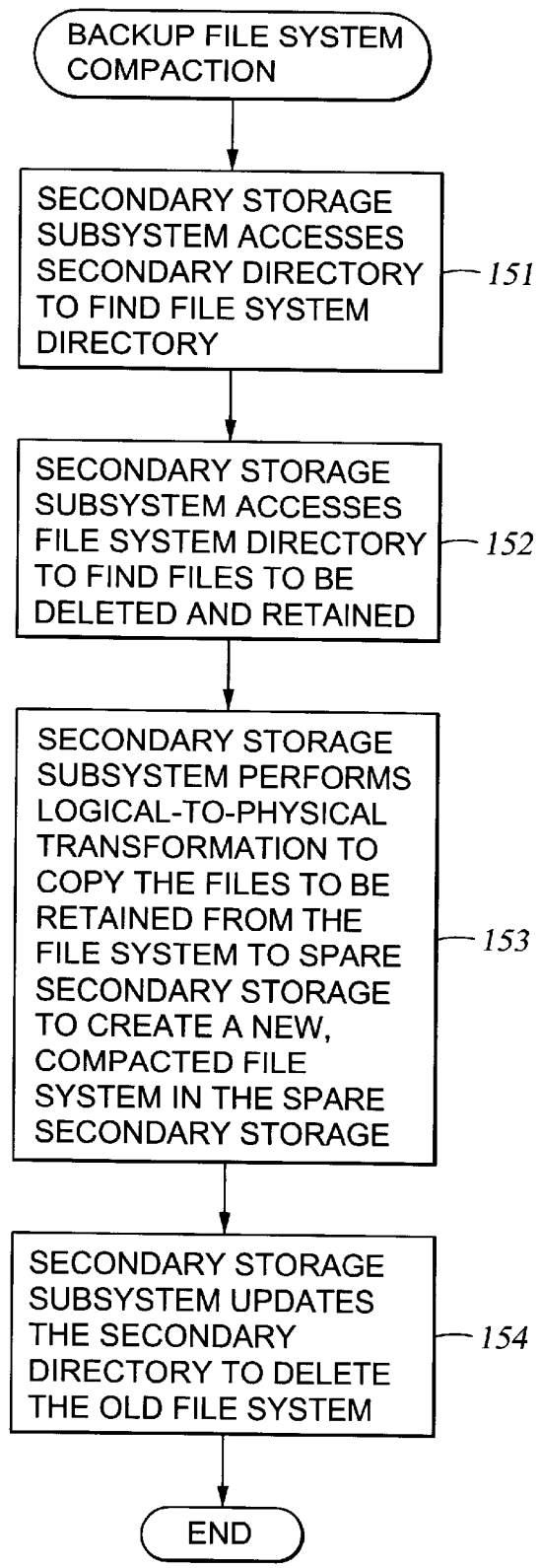
FIG. 10 is a flowchart of a backup file system compaction procedure that may be used as a background process.

With reference to FIG. 10, there is shown a flowchart of a specific example of a procedure for compaction of a backed-up file system. This procedure could be performed as a background process in a secondary data storage subsystem. The procedure, for example, deletes files of the file system that have expired or that a user or application program did not request to be backed up. The secondary data storage subsystem can recognize expired files by comparison of the file expiration life-time attribute to the difference between the current date and the date in the date-time stamp of the backup tag for the file system's physical storage unit. The secondary data storage subsystem can recognize files that the user did not request to be backed up in a version of a backed-up file system by receiving a list of such files and an associated backup tag in a file deletion command from the backup software or from the backup agent. For example, in the data processing system of FIG. 2, a host could transmit the file deletion command over the link 92 between the data network 30 and the secondary data storage subsystem. The secondary data storage subsystem 43 in FIGS. 2 and 4 could delete the files that the user did not request to be backed up before the back-up version of the file system is written from the cached data storage subsystem 71 in FIG. 4 to the tape library unit 70 in FIG. 4. For example, in the secondary data storage subsystem 43 of FIG. 4, the file compaction procedure is performed by one of the back-end data movers 72, 73 upon a copy of the backed-up file system stored in the cache memory 86 or disk array 87 of the cached disk data storage subsystem 71. Upon completion of a file deletion command, the secondary data storage subsystem would return an acknowledgment to the host, and the host could update its catalog to reflect deletion of the files from the back-up version of the file system.

In a first step 151 of FIG. 10, the back-end data mover accesses the secondary directory (48 in FIG. 4) to find the file system directory for a backup version of the file system to be compacted. Then in step 152, the data mover accesses the file system directory to find the files to be deleted and retained. For example, the back-end data mover sequentially scans through the file names in the directory in order to copy the files to be retained, and in order not to copy the files to be deleted. In step 153, for each file to be retained, the data mover performs a logical-to-physical translation to copy the file out from the backup version the file system to spare secondary storage in order to create a new, compacted file system in the spare secondary storage. Finally, in step 154, the back-end data mover updates the secondary directory to refer to the new, compacted file system and thereby delete the original backup version of the file system. If the original backup version of the file system had been written onto tape in the tape library unit, then the original backup version would be erased from the tape, for example, by being overwritten by compacted backup data or new backup data.

III. Virtual Storage and Block Level Direct Access of Secondary Storage for Recovery of Backup Data.

As described above with respect to FIG. 9, steps 144 to 145, it is desirable to permit the backup agent to access spare primary storage for use in performing a logical-to-physical transformation by restoring a physical storage unit to spare primary storage and then copying the logical data structure out from the physical storage unit in the spare primary storage. When a primary data storage subsystem becomes nearly full, however, spare primary storage becomes a very valuable commodity. In the typical case, additional primary storage is obtained by adding another data storage subsystem to the data processing system, and migrating some of the storage volumes to the newly added data storage subsystem. Due to the relatively high cost of a data storage subsystem and its installation, however, there is an incentive to defer the purchase and installation of additional storage for as long as possible, and to continue using the data storage subsystem when there is very little spare primary storage.

Although it is convenient to use spare primary storage for the logical-to-physical translation associated with the restoration of a logical data structure, it is possible to perform the logical-to-physical translation without using any spare primary storage. For example, the logical-to-physical translation could be performed on a copy of the physical storage unit in spare disk storage in the secondary data storage subsystem, or by a block-level direct access of the tape storage. In a preferred embodiment, the backup agent provides the backup software with access to what appears to be spare primary storage containing a copy of a backup version of a physical storage unit. If sufficient spare primary storage is unavailable for storing the copy of the backup version of the physical storage unit, then the backup agent responds to a request for access to the spare primary storage by performing a block-level direct access of the secondary storage. The block-level direct access of the secondary storage may access spare disk storage in the secondary storage or may directly access the tape storage. The preferred embodiment will be described with reference to the functional block diagrams in FIGS. 11 to 13

Figure 11:
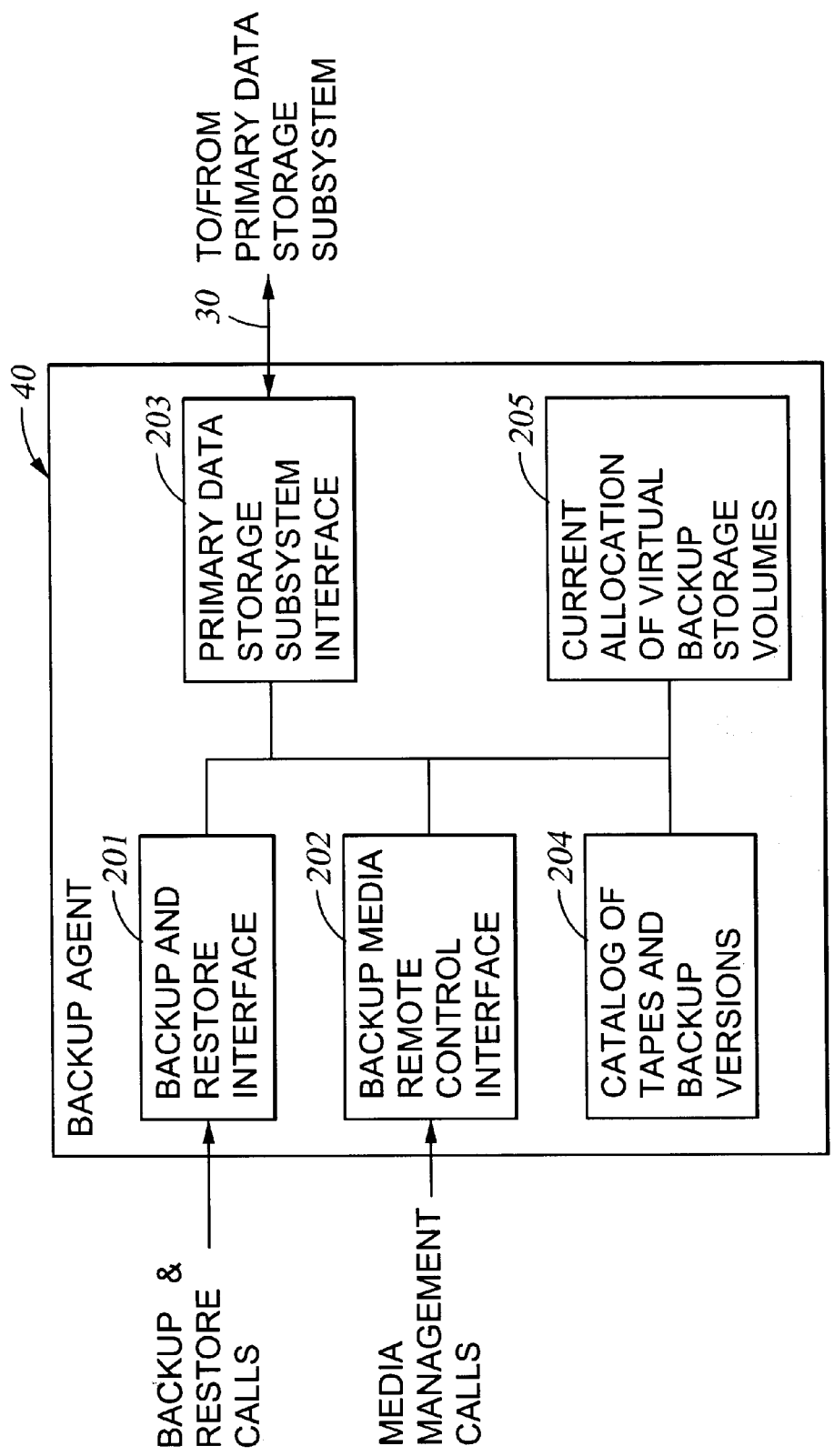
FIG. 11 is a functional block diagram of the backup agent.

FIG. 11 shows a functional block diagram of the backup agent. The backup agent includes a backup and restore interface 201 for receiving backup and restore calls from backup software, and a backup media remote control interface 202 for receiving media management calls. The backup software has the option of performing backup and restore functions by calling the backup and restore interface 201 without ever calling the backup media remote control interface, in which case the backup agent and the secondary data storage subsystem automatically follow a set of default procedures for managing the backup media sufficient for basic backup, cataloging, and restore functions. Alternatively, the backup software can more directly control the backup media by calling the backup media remote control interface 202. In either case, the backup and restore interface 201 and the backup media remote control interface use a primary data storage subsystem interface 203 to send commands to and receive responses from at least one associated primary data storage subsystem (41 in FIG. 12). The associated primary data storage subsystem executes the commands, or forwards the commands to an associated secondary data storage subsystem (43 in FIG. 13). For example, the backup media remote control interface 202 primarily sends commands that are forwarded by the primary data storage subsystem to the secondary data storage subsystem.

The backup and restore interface 201 may access a catalog 204 of tapes and backup versions, as described above. The backup media remote control interface 202 may also access the catalog 204 of tapes and backup versions. The catalog 204 could be stored on the host or in primary storage of the primary data storage subsystem (41 in FIG. 12) that has been configured for access by the host (32 in FIG. 2) on which the backup agent 40 resides. A copy of the information in the catalog 204 may also be contained in the secondary data storage subsystem, in order to locate the backup versions for recovery purposes in the event that the catalog 204 is destroyed.

The backup agent also maintains a current allocation 205 of virtual backup storage volumes. The backup software can request restoration of a backup version to a dynamically allocated volume. If a spare primary storage volume is available, then the spare primary storage volume is dynamically allocated and a virtual volume is assigned to it; otherwise, a virtual volume is assigned to the backup version, and access by the backup software to the virtual volume results in a block-level direct access to the corresponding backup version in secondary storage. A preferred allocation and assignment process will be further described below with reference to FIGS. 14–16.

Figure 12:
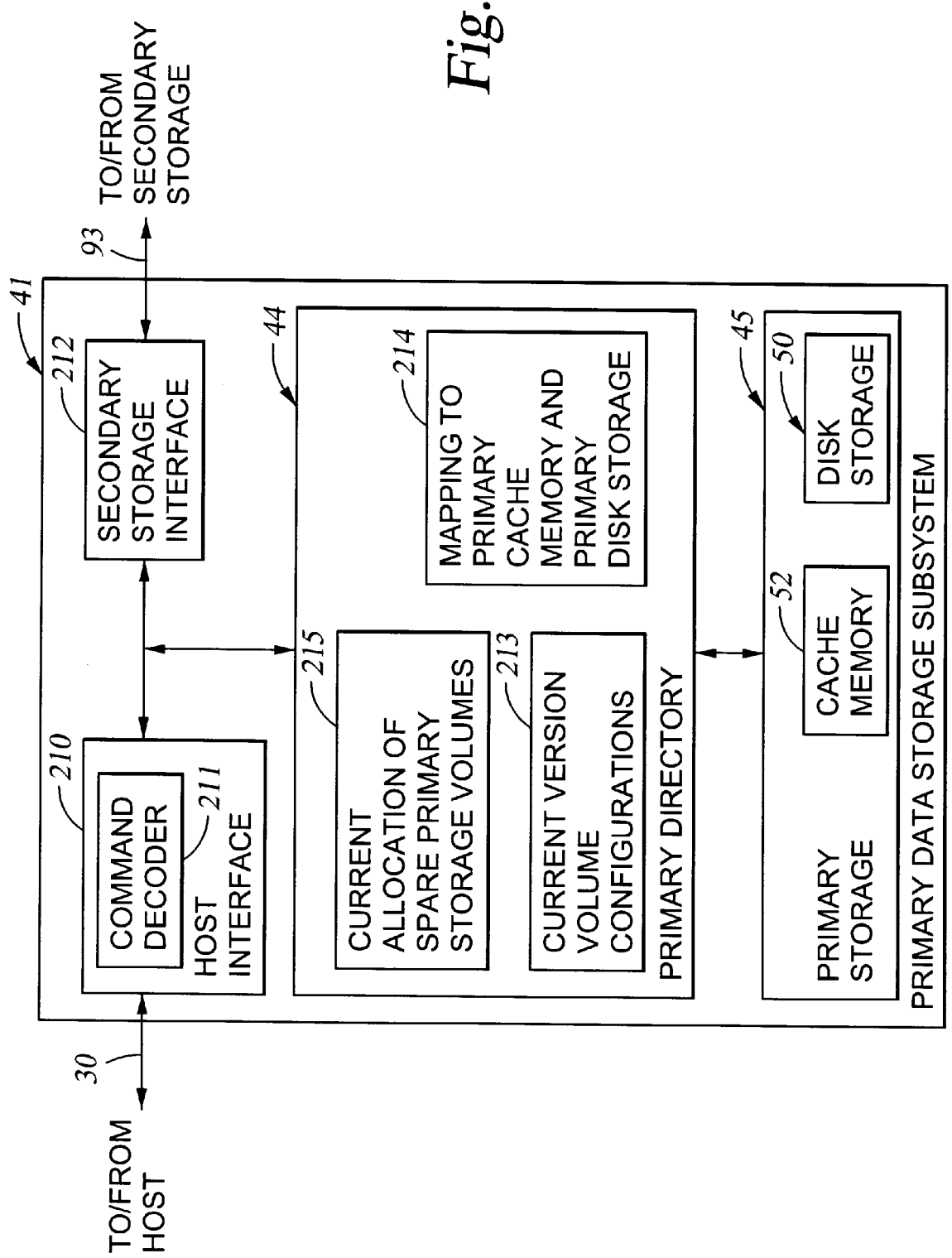
FIG. 12 is a functional block diagram of the primary data storage subsystem.

With reference to FIG. 12, the primary data storage subsystem 41 includes a host interface 210 having a command decoder 21 1 that recognizes the backup and restore commands and the backup media remote control commands transmitted by the primary data storage subsystem interface (203 in FIG. 11) of the backup agent (40 in FIG. 11). The command decoder translates or forwards most of the backup, restore, and backup media remote control commands to a secondary storage interface that transmits corresponding commands to the secondary data storage subsystem (43 in FIG. 13).

The primary directory 44 of the primary data storage subsystem includes a conventional directory of current version volume configurations 213 and a conventional mapping 214 of the current version volume configurations 213 to the disk storage 50 and the cache memory 52 of the primary storage 45. The primary directory 44 further includes a directory of any current allocation 215 of spare primary storage volumes. In other words, the primary data storage subsystem can respond to a host process for a dynamic allocation of any spare storage volume by recording the fact that the spare storage volume is being used by a host process. This will prevent the spare storage volume from being allocated to other host processes or being configured as a current version volume of primary storage, until the host process currently allocated to the spare volume releases the spare volume, or at least until the host process is notified that its access rights to the volume will be terminated.

Figure 13:
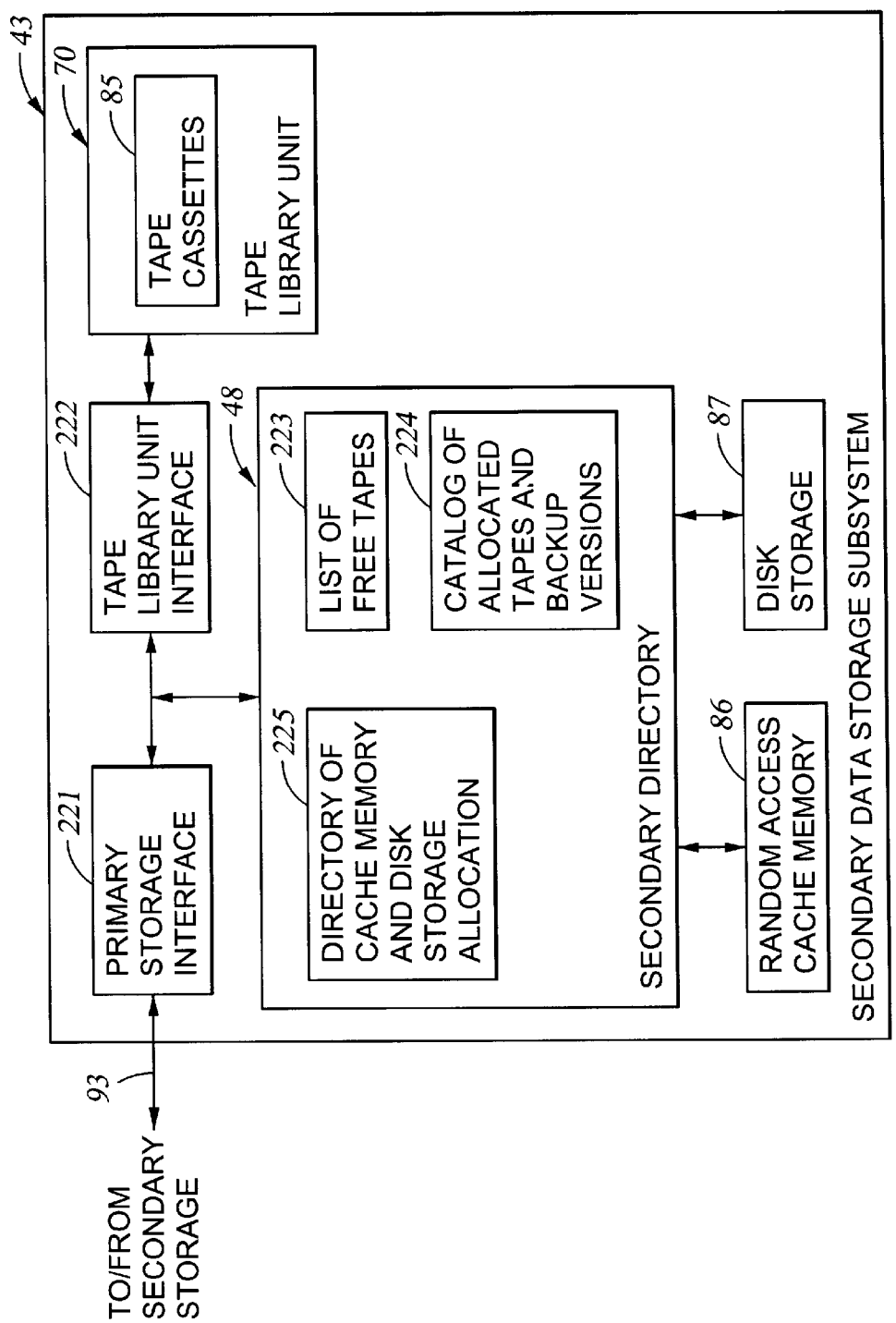
FIG. 13 is a functional block diagram of the secondary data storage subsystem.

With reference to FIG. 13, the secondary data storage subsystem 43 includes a primary storage interface 221 that receives backup, restore, and backup media remote control commands from the secondary storage interface (212 in FIG. 12) of the primary data storage subsystem (41 in FIG. 12). The backup and restore commands are interpreted as described above to write to and read from secondary storage. Preferably, the backup data is addressed in terms of a volume number of the current version at the time of a backup operation, a backup version number, and a block address or block address range within the volume if the physical storage unit being accessed is less than an entire volume. Preferably, at least a portion of the random access cache memory 86 and the disk storage 87 is used as a cache for direct block access of secondary storage. In response to a prefetch command, for example, a specified backup version of a volume is fetched from one of the tape cassettes 85 in the tape library unit 70 and written to disk storage 87 unless a copy of the specified version of the volume already resides in the disk storage 87. The random access cache memory 86 is used as an intermediate buffer between the tape cassettes 85 and the disk storage 87, and in the buffering process, tracks of the backup data are allocated to and retained in the cache memory 86 on a "least recently used" basis. In a similar fashion, the cache memory 86 is accessed and used as an intermediate buffer when backup data are fetched from the secondary storage in response to direct block access commands from the primary data storage subsystem (41 in FIG. 12).

The secondary directory 48 includes a directory of cache memory and disk storage locations 225 that indicates what backup versions are stored in the random access cache memory 86 and disk storage 86 and that includes a "least recently used" list of the cache memory blocks and a "least recently used" list of the disk storage volumes. The "least recently used" lists are managed so that the least recently used random access cache memory track or the least recently used disk storage volume is allocated to a backup version being fetched or prefetched from the tape library unit 85. The secondary directory 48 also includes a list of free tapes 223 in the tape library unit 70, and a catalog of the allocated tapes and the backup versions that are stored in the allocated tapes. The primary storage interface 221 accesses the secondary directory 48, and in particular the directory of cache memory and disk storage allocation 225, in an attempt to satisfy a backup or restore command by accessing the random access cache memory 86 or disk storage 87. The primary storage interface 331 can operate in a mode in which it acknowledges to the primary data storage subsystem completion of a backup operation as soon as a backup version is written to disk storage 87 before it is actually written to the tape cassettes 85 in the tape library unit 70. The tape library unit interface 222 accesses the secondary directory 48, and in particular the list of free tapes 223 and the catalog of allocated tapes and backup versions 224, in order to write backup versions to the tape cassettes 85 in the tape library unit 70 or to read the backup versions from the tape cassettes 85.

With reference to FIG. 14, there is shown a table representation 205 for the information defining the current allocation of virtual backup storage volumes as introduced in FIG. 11. As shown in FIG. 14, the table 205 associates a virtual volume number of a host process with a backup version number and a primary volume number from which the backup was made. The table 205 also includes a column for the volume number of any spare primary storage allocated to the virtual volume, and a set of flags for indicating whether or not a spare volume of primary storage is allocated to the virtual volume. Alternatively, instead of using a flag to indicate whether or not a spare volume of primary storage is allocated to a virtual volume, the spare volume number in the table entry for a virtual volume could be set to a null value not associated with any volume of primary storage to indicate that a spare volume of primary storage is not allocated to the virtual volume.

Figure 15:
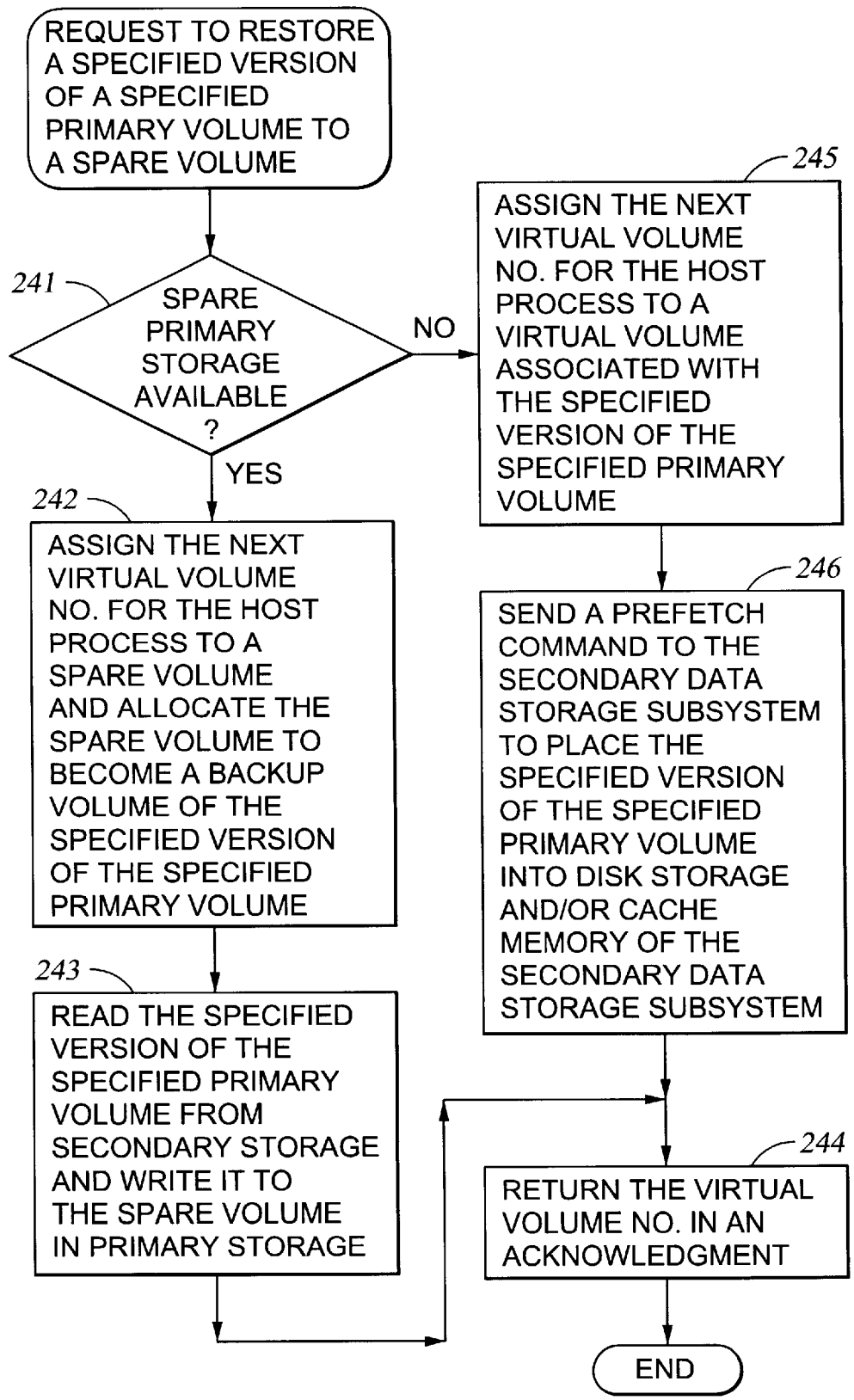
FIG. 15 is a flowchart of a backup agent routine for responding to a request from a host process such as a backup software routine for restoration of a specified version of a specified primary volume to a spare volume.

With reference to FIG. 15, there is shown a flowchart of a backup agent routine for responding to a request from a host process such as a backup software routine for restoration of a specified version of a specified primary volume to a spare volume. In step 241, execution continues to step 242 if a volume of spare primary storage is available. For example, the backup agent checks whether or not the primary storage subsystem has the capability of dynamically assigning a spare storage volume, and if so, the backup agent sends a command to the primary data storage subsystem requesting dynamic assignment of a spare storage volume. If the primary data storage subsystem returns a spare volume number of a spare volume dynamically assigned to the host of the backup agent, then execution continues to step 242. In step 242, the backup agent assigns the next virtual volume number for the host process to the allocated spare volume, and allocates the spare volume to become a backup volume of the specified version of the specified primary volume. In other words, in the table 205, a table entry is created including the next virtual volume number for the host process, a flag indicating that a spare volume has been allocated, the volume number of the spare volume, the specified backup version number, and the specified primary volume number. Each host process could, at any time, use the same virtual volume number, because there will be a separate entry in the table 205 for each host process having been assigned to the same virtual volume number. Therefore, at any given time, the virtual volume number assigned to one host process may map to a spare volume number in primary storage that is different from the spare volume number in the primary storage subsystem that is mapped to the same virtual volume number assigned to another host process. The next virtual volume number, for example, is the smallest virtual volume number not currently assigned to the host process. The first two columns of the table 205, for example, indicate what virtual volumes are currently assigned to each process. The smallest virtual volume number associated with each host process can be found by scanning the first two entries of the table 205 if the table entries for each host process are ordered by the virtual volume number (for example, in the form of a doubly-linked list), or by searching a free virtual volume list maintained for each host process. For example, a free virtual volume list may include the highest virtual volume number if any currently allocated to the host process and a list of free virtual volume numbers that are less than the highest virtual volume number if any currently allocated to the host process.

Next, in step 243, the specified version of the specified primary volume is read from secondary storage and written to the allocated spare volume in primary storage. Finally, in step 244, the backup agent returns the virtual volume number to the host process in an acknowledgment that the specified backup version of a specified primary volume has been restored to the virtual volume.

If in step 241 a spare volume of primary storage is not available, then execution branches from step 241 to step 245. In step 245, the backup agent assigns the next virtual volume number for the host process to a virtual volume associated with the specified version of the specified primary volume. In step 246, the backup agent sends a prefetch command to the secondary data storage subsystem in order to place the specified backup version of the specified primary volume into disk storage and/or cache memory of the secondary data storage subsystem. For example, the backup agent sends the prefetch command to the primary data storage subsystem, and the primary data storage subsystem forwards the prefetch command to the secondary data storage subsystem. Finally, in step 244, the backup agent returns the virtual volume number to the host process in an acknowledgment that the specified backup version of a specified primary volume has been restored to the virtual volume.

Figure 16:
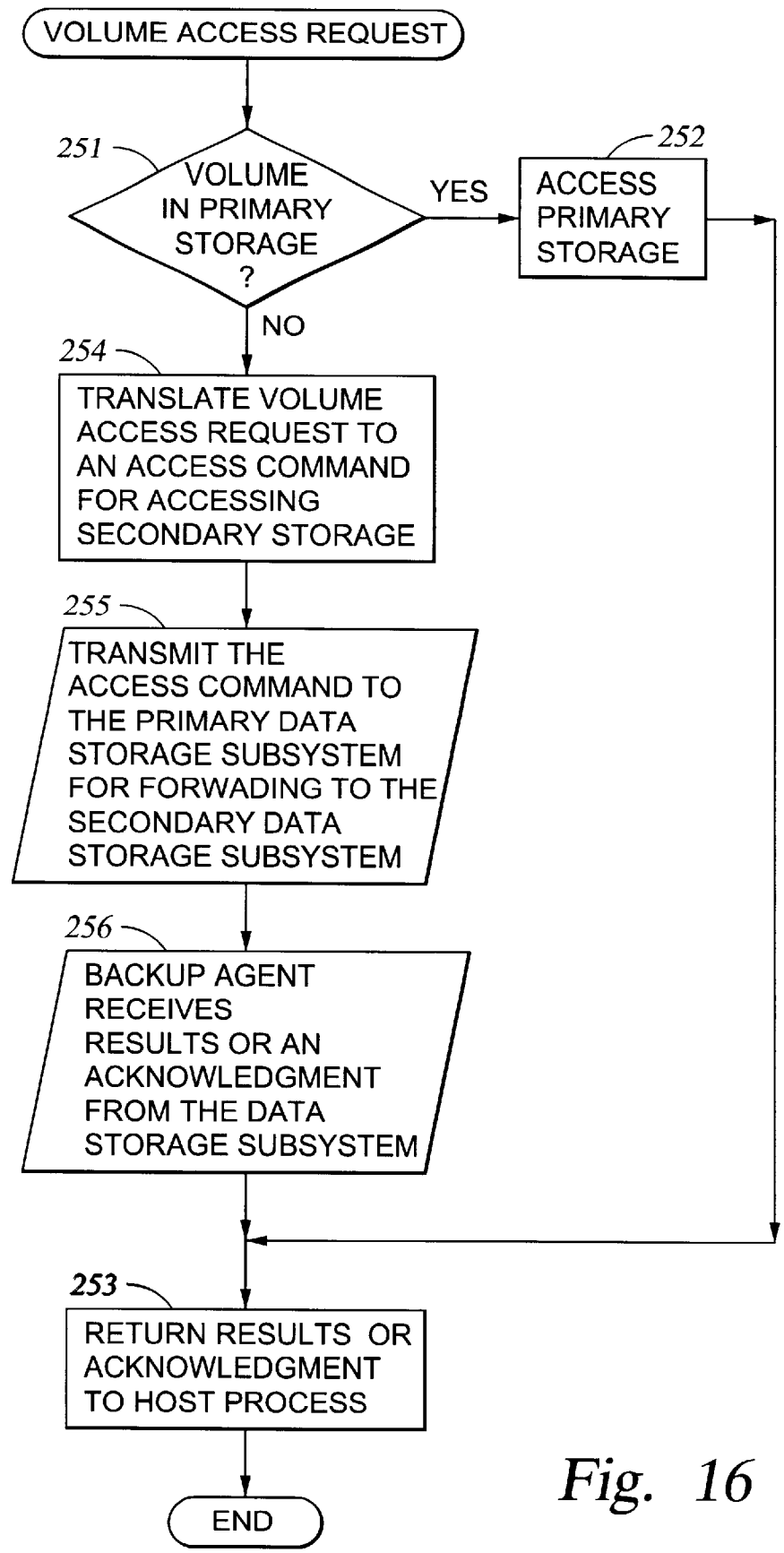
FIG. 16 is a flowchart of a backup routine for responding to a request from a host process such as a backup software routine for access to a specified storage volume.

With reference to FIG. 16, there is shown a flowchart of a backup agent routine for responding to a request from a host process such as a backup software routine for access to a specified storage volume. In step 251, execution branches to step 252 if the specified storage volume is a current version in primary storage. For example, the virtual volume numbers are always lager than the volume numbers of current versions in primary storage. The volume number specified by the host process is compared to a certain threshold volume number, and if the specified volume number is less than the threshold volume number, execution branches to step 252. In step 252, the backup agent forwards the host process volume access request as a conventional data access command to the primary data storage subsystem. Finally, in step 253, the backup agent returns the results or an acknowledgment to the host process having requested access.

If in step 251 the specified volume number is recognized as a virtual volume number, then execution continues from step 251 to step 254. In step 254, the volume access request from the host process is translated to an access command for accessing secondary storage. For example, the access command for accessing the secondary storage specifies the backup version number and primary volume number found in the entry of the table 205 of FIG. 14 for the host process and specified virtual volume number. In a typical case, such as an access to a logical data structure in order to copy the logical data structure out of the backup volume, the data access request will be a direct block access read request further specifying a range of block addresses within the volume. Next, in step 255, the access command for accessing the secondary storage is transmitted to the primary data storage subsystem, for forwarding to the secondary data storage subsystem. In step 256, the backup agent receives results or an acknowledgment from the primary data storage subsystem. Finally, in step 253, the backup agent returns the results or an acknowledgment to the host process having requested access.

Once a host process is finished using the virtual volume, it should notify the backup agent so that the backup agent can release any spare primary storage allocated to the virtual volume. The backup agent releases the primary storage allocated to the virtual volume and may then remove the entry for the virtual volume from the virtual volume allocation table (205 in FIG. 14). However, if the virtual volume has a read-only attribute, which can be the case if the virtual volume is used only for storing a copy of a backup version of a primary volume, it is also possible for the backup agent to release at any time any spare storage allocated to a virtual volume. In this case, the host process can still continue reading the virtual volume by direct block access to the secondary storage instead of accessing the copy of the backup version in the spare storage. For example, if a spare storage volume of the primary data storage subsystem needs to be configured for use as a current version of a primary volume and the spare storage volume is presently allocated as a virtual volume for storing a copy of a backup version, then the directory (215 in FIG. 12) of spare storage allocation in the primary data storage backup agent is inspected to find any current allocation, and upon finding that the spare storage volume is currently allocated to the backup agent, the backup agent is requested to release the spare storage volume. The backup agent then removes the allocation of the spare storage volume to the virtual volume by changing the corresponding flag in the virtual volume allocation table (205 in FIG. 14) and/or removing the spare volume number from the virtual volume allocation table, and then removes its allocation of the spare volume from the directory (215 in FIG. 12) of spare primary storage in the primary data storage subsystem. The spare volume can then be configured for use as a current version of a primary volume.

Although the management of allocation of virtual volumes and the translation of virtual volume access requests to spare volume access requests or direct block access requests has been described as being performed by the backup agent, it is possible for the primary data storage subsystem to be programmed to perform these functions instead of the backup agent. In this case, the virtual volume allocation table (205 of FIG. 11) would reside in the primary data storage subsystem (31 in FIG. 12) and a port adapter (55 in FIG. 3) of the primary data storage subsystem would be programmed to perform the functions of FIGS. 15 and 16. Although this would require the use of some processing power of the port adapter, it is possible to provide the port adapter with the additional processing capability by using an additional pipelined processing unit in the port adapter.

IV. Remote Control of Backup Media in a Secondary Storage Subsystem Through Access to a Primary Storage Subsystem.

As described above with reference to FIGS. 11 to 13, the backup software has the capability of remote control of the backup tape library unit 70 in the secondary data storage subsystem 43 of FIG. 13 through access to the primary data storage subsystem 41 in FIG. 12. In particular, the preferred sequence of steps is summarized in the flow chart of FIG. 17.

Figure 17:
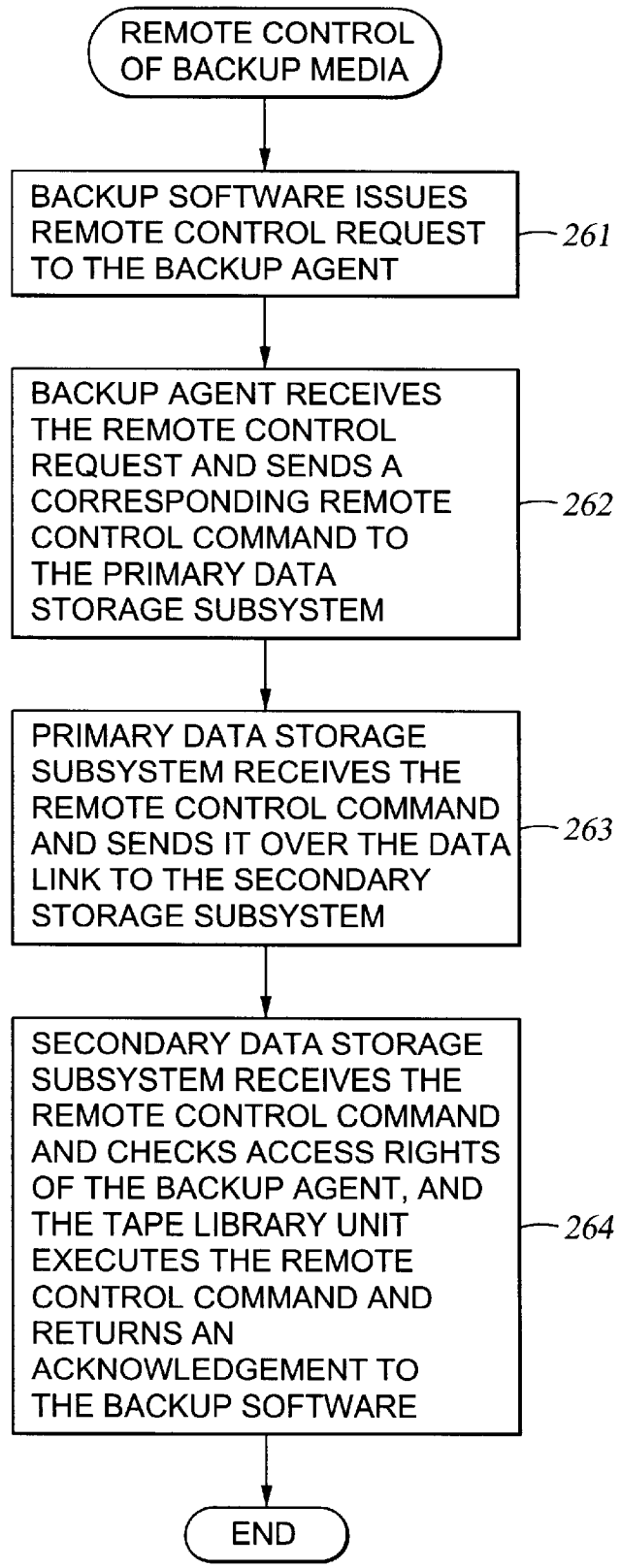
FIG. 17 is a flowchart showing the processing of a backup media remote control request from a host process such as a backup software routine.

In a first step 261 of FIG. 17, the backup software issues a backup media remote control request to the backup agent. In step 262, the backup agent receives the remote control request from the backup software, and sends a corresponding backup media remote control command to the primary data storage subsystem. The remote control request is included in a media management call to the backup media remote control interface (202 in FIG. 11) of the backup agent, and the remote control is transmitted by the primary data storage subsystem interface (203 in FIG. 11) of the backup agent.

In step 263, the primary data storage subsystem receives the remote control command from the backup agent, and sends it over the dedicated data link (93 in FIGS. 12–13) to the secondary storage subsystem. In particular, the command decoder (211 in FIG. 12) in the host interface (210 in FIG. 12) of the primary data storage subsystem recognizes the host command as a backup media remote control command, and forwards it to the secondary storage interface (212 in FIG. 12) of the primary data storage subsystem, which sends it over the dedicated data link (93 in FIG. 12) to the secondary storage subsystem.

Finally, in step 264, the secondary data storage subsystem receives the remote control command from the dedicated data link (92 in FIG. 13), and the tape library unit (70 in FIG. 13) of the secondary storage subsystem executes the remote control command and returns an acknowledgment to the backup software. In particular, the primary storage interface (221 in FIG. 13) of the secondary data storage subsystem receives the remote control command from the dedicated data link, and forwards it to the tape library unit interface (222 in FIG. 13) of the secondary data storage subsystem. The primary storage interface is in one of the data movers (74, 75 in FIG. 4) of the secondary data storage subsystem servicing the dedicated data link 93, and the tape library unit interface is in one of the data movers (72, 73) servicing the tape library unit. The tape library unit interface sends the remote control command to the tape library unit.

The backup media remote control commands permit the backup software to have direct control over basic functions of the tape library unit. For this reason, in an open systems environment, in step 264 of FIG. 17, the secondary data storage system may authenticate the backup software originating each command and should check the access rights of the backup software (or its host processor) to the backup versions and the tapes, in order to deny access to backup software that is attempting to access a tape or backup version that the backup software (or its host processor) has no right to access. For example, the remote control commands permit specified tapes to be added to and removed from the tape library unit, mounted and unmounted from the read/write stations in the tape library units, and read, written to, and formatted or erased. The remote control commands also permit control over the tape transport process, such as reading the status of each transport to identify any tape cassette mounted in the tape transport and the current location on the tape if known of any tape cassette mounted in the tape transport, and permitting rewind, fast-forward, fast-reverse and record locate and search operations.

In a preferred embodiment, the backup media remote control commands that the primary data storage subsystem 41 receives from a host processor include basic SCSI query commands and SCSI action commands that the tape library unit 70 will recognize. These basic SCSI commands are passed from the host processor through the primary data storage subsystem 41 and from the primary data storage subsystem through the secondary data storage subsystem 43 to a SCSI bus of the tape library unit 70. The SCSI bus of the tape library unit 70 links all the tape transport units and robotic tape handlers in the tape library unit. The tape library unit 70 executes the SCSI command, and returns a response through the secondary data storage subsystem 43 to the primary data storage subsystem 40, and through the primary data storage subsystem 41 to the host processor. For example, a response to a basic SCSI query command may identify the tape transport units and robotic tape handlers in the tape library unit 70. In response to a more specific "get state" query command to a specified tape transport, the tape transport will report the status of any tape cassette mounted in the tape transport, including a current file number, the total storage capacity (in bytes) of the tape cassette, whether or not the blocks on the tape are of fixed size or variable size, the size (in bytes) of the blocks, the current block number, the amount of space (in bytes) remaining on the tape, and the current number of soft errors encountered when reading the tape. When writing to a tape, the amount of space remaining on the tape is used in order to determine whether or not a next backup version will fit on the tape currently mounted in the tape transport. In response to a basic SCSI action command, a tape cassette can be moved by a robotic tape handler, and the tape in the tape cassette can be moved by a tape transport, and a response indicating successful or unsuccessful completion of the action will be passed back to the host processor. A response to a SCSI "read" command will include the data read from the tape cassette. The tape library unit 70 will also respond to a SCSI "reset device" command that will reset the state of a specified robotic tape handler or tape transport, and a "reset bus" command that will reset the state of all of the robotic tape handlers and tape transports. The "reset device" command is used, for example, when a device fails to respond properly to a series of SCSI commands, and the "reset bus" command is used during a power-up or restart of the of the tape library unit 70.

In view of the above, there has been described a way of assigning a virtual storage address to a specified backup version in order to facilitate host access to the specified backup version. If spare storage is available in the primary data storage subsystem for storing a copy of the specified backup version, then spare storage is allocated to the backup version, and the host processor accesses the copy of the specified backup version by sending to the primary data storage subsystem storage access requests which specify the assigned virtual storage address. If spare storage is not available in the primary data storage subsystem for storing a copy of the specified backup version, then the primary storage subsystem forwards the storage access requests from the host processor to the secondary data storage subsystem which may perform a block-level direct access of the backup version in the secondary storage. In either case, the host processor appears to access storage in the primary data storage subsystem. In this fashion, any block-level direct access of the backup version in the secondary storage is transparent to the host processor.

What is claimed is:

1. A method of permitting at least one host processor to obtain from a data storage subsystem access to backup versions, the data storage subsystem having primary data storage, the backup versions being stored in secondary data storage linked to the data storage subsystem for transfer of the backup versions from the secondary data storage to the data storage subsystem, said method comprising:
   a) the host processor transmitting to the data storage subsystem a request for assignment of a virtual storage address from which a specified backup version in the secondary data storage can be accessed via storage access requests that are transmitted from the host processor to the data storage subsystem;
   b) the data storage subsystem responding to the request for assignment of a virtual storage address by assigning a virtual storage address from which the specified backup version in the secondary data storage can be accessed via storage access requests that are transmitted from the host processor to the data storage subsystem;
   c) the host processor accessing the specified backup version by transmitting to the data storage subsystem storage access requests that specify the assigned virtual storage address and that specify portions of the specified backup version to be accessed; and
   d) the data storage subsystem responding to the storage access requests by accessing the specified portions of the specified backup version to be accessed.

2. The method as claimed in claim 1, wherein the data storage subsystem further responds to the request for assignment of a virtual storage address by checking whether or not spare data storage is available in the data storage subsystem for storage of the specified backup version, and when spare data storage is available in the data storage subsystem for storage of the specified backup version, allocating the spare data storage for storage of the specified backup version, mapping the assigned virtual storage address to an address of the spare data storage allocated for storing the specified backup version, and transmitting a copy of the specified backup version from the secondary data storage to the spare data storage allocated for storing the specified backup version.

3. The method as claimed in claim 1, wherein the data storage subsystem responds to the data storage access requests by checking whether or not the specified virtual storage address is mapped to data storage in the data storage subsystem, and when the specified virtual storage address is found to be mapped to data storage in the data storage subsystem, accessing the data storage in the data storage subsystem to which the specified virtual storage address is found to be mapped.

4. The method as claimed in claim 1, wherein the secondary data storage includes tape storage and disk storage, and the specified backup version is stored in the tape storage, and wherein the data storage subsystem further responds to the request for assignment of a virtual storage address by checking whether or not spare data storage is available in the data storage subsystem for storage of the specified backup version, and when spare data storage is not available in the data storage subsystem for storage of the specified backup version, issuing a prefetch command to the secondary data storage for reading a copy of the specified backup version from the tape storage and storing the copy of the specified backup version in the disk storage.

5. The method as claimed in claim 1, wherein the data storage subsystem responds to the data storage access requests by checking whether or not the specified virtual storage address is mapped to data storage in the data storage subsystem, and when the specified virtual storage address is found not to be mapped to data storage in the data storage subsystem, transmitting storage access requests to the secondary data storage to access the specified backup version in the secondary data storage.

6. The method as claimed in claim 1, wherein the data storage subsystem responds to the data storage access requests by transmitting storage access requests to the secondary data storage to access the specified backup version in the secondary data storage.

7. The method as claimed in claim 1, wherein the specified backup version contains a logical data structure including a series of physical storage components, and wherein the method includes the host processor performing a logical-to-physical translation by identifying the physical storage components of the logical data structure in the specified backup version, and by transmitting the data storage access requests to the data storage subsystem for copying the physical storage components of the logical data structure from the specified backup version to create a current version of the logical data structure in the primary data storage of the data storage subsystem.

8. A machine-readable program storage device containing a program for a storage controller of a data storage subsystem permitting at least one host processor to obtain from the data storage subsystem access to backup versions, the backup versions being stored in secondary data storage linked to the data storage subsystem for transfer of the backup versions from the secondary data storage to the data storage subsystem, said program being executable by the storage controller for:

a) receiving from the host processor a request for assignment of a virtual storage address from which a specified backup version in the secondary data storage can be accessed via storage access requests that are transmitted from the host processor to the data storage subsystem;

b) responding to the request for assignment of a virtual storage address by assigning a virtual storage address from which the specified backup version in the secondary data storage can be accessed via storage access requests that are transmitted from the host processor to the data storage subsystem;

c) receiving from the host processor storage access requests that specify the assigned virtual storage address and that specify portions of the specified backup version to be accessed; and d) responding to the data storage access requests by accessing the specified portions of the specified backup version to be accessed.

9. The machine readable program storage device as claimed in claim 8, wherein the program is executable by the data storage controller for responding to the request for assignment of a virtual storage address by checking whether or not spare data storage is available in the data storage subsystem for storage of the specified backup version, and when spare data storage is available in the data storage subsystem for storage of the specified backup version, allocating the spare data storage for storage of the specified backup version, mapping the assigned virtual storage address to an address of the spare data storage allocated for storing the specified backup version, and transmitting a copy of the specified backup version from the secondary data storage to the spare data storage allocated for storing the specified backup version.

10. The machine readable program storage device as claimed in claim 8, wherein the program is executable by the storage controller for responding to the storage access requests by checking whether or not the specified virtual storage address is mapped to data storage in the data storage subsystem, and when the specified virtual storage address is found to be mapped to data storage in the data storage subsystem, accessing the data storage in the data storage subsystem to which the specified virtual storage address is found to be mapped.

11. The machine readable program storage device as claimed in claim 8, wherein the secondary data storage includes disk storage and tape storage, the specified backup version is stored in the tape storage and the program is executable by the storage controller for responding to the request for assignment of a virtual storage address by checking whether or not spare data storage is available in the data storage subsystem for storage of the specified backup version, and when spare data storage is not available in the data storage subsystem for storage of the specified backup version, issuing a prefetch command to the secondary data storage for reading a copy of the specified backup version from the tape storage and writing the copy of the specified backup version to the disk storage.

12. The machine readable program storage device as claimed in claim 8, wherein the storage controller is programmed for responding to the storage access requests by checking whether or not the specified virtual storage address is mapped to data storage in the data storage subsystem, and when the specified virtual storage address is found not to be mapped to data storage in the data storage subsystem, transmitting storage access requests to the secondary data storage to access the specified backup version in the secondary data storage.

13. The machine readable program storage device as claimed in claim 8, wherein the storage controller is programmed for responding to the storage access requests by transmitting storage access requests to the secondary data storage to access the specified backup version in the secondary data storage.

14. A machine readable program storage device containing a program for a storage controller for a data storage subsystem permitting at least one host processor to obtain from the data storage subsystem access to backup versions, the backup versions being stored in secondary data storage linked to the data storage subsystem for transfer of the backup version from the secondary data storage to the data storage subsystem, said program being executable by the storage controller for:

a) receiving from the host processor a request for allocation of spare data storage from which a specified backup version can be accessed via storage access requests transmitted from the host processor to the data storage subsystem, and responding to the request from the host processor for allocation of the spare data storage by associating a virtual storage address with the specified backup version, and checking whether or not spare data storage is available in the data storage subsystem for storage of the specified backup version, and when spare data storage is available in the data storage subsystem for storage of the specified backup version, allocating the spare data storage for storing the specified backup version, mapping the virtual storage address to an address of the spare data storage allocated for storing the specified backup version, and transmitting a copy of the specified backup version from the secondary data storage to the spare data storage allocated for storing the specified backup version; and b) receiving from the host processor storage access requests specifying said virtual storage address; and responding to the storage access requests from the host processor by checking whether or not there is a mapping of the specified virtual storage address to data storage in the data storage subsystem, and when there is a mapping of the specified virtual storage address to data storage in the data storage subsystem, accessing the data storage in the data storage subsystem to which the virtual storage address is mapped, and when there is not a mapping of the specified virtual storage address to data storage in the data storage subsystem, then accessing the specified backup version associated with the virtual storage address by accessing the secondary data storage.

15. The machine readable program storage device as claimed in claim 14, wherein the secondary data storage includes disk storage and tape storage, and the specified backup version is stored in the tape storage, and the program is executable by the storage controller for responding to the request from the host processor for allocation of the spare data storage when spare data storage is not available in the data storage subsystem for storage of the specified backup version by transmitting a prefetch request from the data storage subsystem to the secondary data storage for reading a copy of the specified backup version from the tape storage, and writing the copy of the specified backup version to the disk storage.

16. A data storage subsystem for permitting at least one host processor to obtain access to backup versions stored in secondary data storage, wherein the data storage subsystem comprises primary data storage and a storage controller coupled to the primary data storage for controlling access to the primary data storage, the storage controller having at least one data port for linking the primary data storage and the secondary data storage to the host processor for transfer of data between the primary data storage and the secondary data storage and the host processor, wherein the storage controller is programmed for:

a) receiving from the host processor a request for assignment of a virtual storage address from which a specified backup version in the secondary data storage can be accessed via storage access requests that are transmitted from the host processor to the storage controller;

b) responding to the request for assignment of a virtual storage address by assigning a virtual storage address from which the specified backup version in the secondary data storage can be accessed via storage access requests that are transmitted from the host processor to the storage controller;

c) receiving from the host processor storage access requests that specify the assigned virtual storage address and that specify portions of the specified backup version to be accessed; and d) responding to the storage access requests by accessing the specified portions of the specified backup version to be accessed.

17. The data storage subsystem as claimed in claim 16, wherein the program is executable by the storage controller for responding to the request for assignment of a virtual storage address by checking whether or not spare data storage is available in the data storage subsystem for storage of the specified backup version, and when spare data storage is available in the data storage subsystem for storage of the specified backup version, allocating the spare data storage for storage of the specified backup version, mapping the assigned virtual storage address to an address of the spare data storage allocated for storing the specified backup version, and transmitting a copy of the specified backup version from the secondary data storage to the spare data storage allocated for storing the specified backup version.

18. The data storage subsystem as claimed in claim 16, wherein the program is executable by the storage controller for responding to the storage access requests by checking whether or not the specified virtual storage address is mapped to data storage in the data storage subsystem, and when the specified virtual storage address is found to be mapped to data storage in the data storage subsystem, accessing the data storage in the data storage subsystem to which the specified virtual storage address is found to be mapped.

19. The data storage subsystem as claimed in claim 16, wherein the secondary data storage includes disk storage and tape storage, the specified backup version is stored in the tape storage, and the program is executable by the storage controller for responding to the request for assignment of a virtual storage address by checking whether or not spare data storage is available in the data storage subsystem for storage of the specified backup version, and when spare data storage is not available in the data storage subsystem for storage of the specified backup version, issuing a prefetch command to the secondary data storage for reading a copy of the specified backup version from the tape storage and writing the copy of the specified backup version to the disk storage.

20. The data storage subsystem as claimed in claim 16, wherein the storage controller is programmed for responding to the storage access requests by checking whether or not the specified virtual storage address is mapped to data storage in the data storage subsystem, and when the specified virtual storage address is found not to be mapped to data storage in the data storage subsystem, transmitting storage access requests to the secondary data storage to access the specified backup version in the secondary data storage.

21. The data storage subsystem as claimed in claim 16, wherein the storage controller is programmed for responding to the storage access requests by transmitting storage access requests to the secondary data storage to access the specified backup version in the secondary data storage.

22. A data storage subsystem for permitting at least one host processor to obtain access to backup versions stored in secondary data storage, wherein the data storage subsystem comprises primary data storage and a storage controller coupled to the primary data storage for controlling access to the primary data storage, the storage controller having at least one data port for linking the primary data storage and the secondary data storage to the host processor for transfer of data between the primary data storage and the secondary data storage and the host processor, wherein the storage controller is programmed for:

a) receiving from the host processor a request for allocation of spare data storage from which a specified backup version in the secondary data storage can be accessed via storage access requests transmitted from the host processor to the data storage subsystem, and responding to the request from the host processor for allocation of the spare data storage by associating a virtual storage address with the specified backup version, and checking whether or not spare data storage is available in the data storage subsystem for storage of the specified backup version, and when spare data storage is available in the data storage subsystem for storage of the specified backup version, allocating the spare data storage for storing the specified backup version, mapping the virtual storage address to an address of the spare data storage allocated for storing the specified backup version, and transmitting a copy of the specified backup version from the secondary data storage to the spare data storage allocated for storing the specified backup version; and b) receiving from the host processor storage access requests specifying said virtual storage address; and responding to the storage access requests from the host processor by checking whether or not there is a mapping of the specified virtual storage address to data storage in the data storage subsystem, and when there is a mapping of the specified virtual storage address to data storage in the data storage subsystem, accessing the data storage in the data storage subsystem to which the virtual storage address is mapped, and when there is not a mapping of the specified virtual storage address to data storage in the data storage subsystem, then accessing the specified backup version associated with the virtual storage address by accessing the secondary data storage.

23. The data storage subsystem as claimed in claim 22, wherein the secondary data storage includes disk storage and tape storage, the specified backup version is stored in the tape storage, and the program is executable by the storage controller for responding to the request from the host processor for allocation of the spare data storage when spare data storage is not available in the data storage subsystem for storage of the specified backup version by transmitting a prefetch request from the data storage subsystem to the secondary data storage for reading a copy of the specified backup version from the tape storage and writing the copy of the specified backup version to the disk storage.

* * * * *